US012478592B2

(12) United States Patent
Gershon et al.

(10) Patent No.: US 12,478,592 B2
(45) Date of Patent: *Nov. 25, 2025

(54) DOSAGE REGIME WITH ESKETAMINE FOR TREATING NEUROPSYCHIATRIC OR NEUROLOGICAL CONDITIONS

(71) Applicant: CLEXIO BIOSCIENCES LTD., Jerusalem (IL)

(72) Inventors: Ari Gershon, Jerusalem (IL); David Dangoor, Jerusalem (IL)

(73) Assignee: Clexio Biosciences Ltd., Yokne'am (IL)

( * ) Notice: Subject to any disclaimer, the term of this patent is extended or adjusted under 35 U.S.C. 154(b) by 715 days.

This patent is subject to a terminal disclaimer.

(21) Appl. No.: 17/789,648

(22) PCT Filed: Dec. 29, 2020

(86) PCT No.: PCT/IB2020/062508
§ 371 (c)(1),
(2) Date: Jun. 28, 2022

(87) PCT Pub. No.: WO2021/137148
PCT Pub. Date: Jul. 8, 2021

(65) Prior Publication Data
US 2023/0049897 A1 Feb. 16, 2023

Related U.S. Application Data

(60) Provisional application No. 62/954,790, filed on Dec. 30, 2019.

(51) Int. Cl.
| *A61K 31/135* | (2006.01) |
| *A61K 9/00* | (2006.01) |
| *A61K 31/137* | (2006.01) |
| *A61K 31/138* | (2006.01) |
| *A61K 31/15* | (2006.01) |
| *A61K 31/343* | (2006.01) |
| *A61K 31/381* | (2006.01) |
| *A61K 31/4525* | (2006.01) |
| *A61K 45/06* | (2006.01) |
| *A61P 25/02* | (2006.01) |
| *A61P 25/18* | (2006.01) |
| *A61P 25/22* | (2006.01) |
| *A61P 25/24* | (2006.01) |
| *A61P 25/28* | (2006.01) |

(52) U.S. Cl.
CPC .......... *A61K 31/135* (2013.01); *A61K 9/0053* (2013.01); *A61K 31/137* (2013.01); *A61K 31/138* (2013.01); *A61K 31/15* (2013.01); *A61K 31/343* (2013.01); *A61K 31/381* (2013.01); *A61K 31/4525* (2013.01); *A61K 45/06* (2013.01); *A61P 25/02* (2018.01); *A61P 25/18* (2018.01); *A61P 25/22* (2018.01); *A61P 25/24* (2018.01); *A61P 25/28* (2018.01)

(58) Field of Classification Search
CPC .. A61K 31/135; A61K 31/137; A61K 31/138; A61K 31/15; A61K 31/343; A61K 31/381; A61K 31/4525; A61K 45/06; A61K 9/0053; A61K 2300/00; A61K 9/141; A61K 9/16; A61K 9/2054; A61P 25/02; A61P 25/18; A61P 25/22; A61P 25/24; A61P 25/28; A61P 25/00
See application file for complete search history.

(56) References Cited

U.S. PATENT DOCUMENTS

| 7,955,619 B2 | 6/2011 | Shah et al. |
| 9,468,611 B2 | 10/2016 | Manfredi et al. |
| 10,478,405 B2 | 11/2019 | Charney et al. |
| 11,253,487 B2 | 2/2022 | Kagan et al. |
| 11,957,645 B2 | 4/2024 | Kagan et al. |
| 12,016,832 B2 | 6/2024 | Kagan et al. |
| 12,036,189 B2 | 7/2024 | Kagan et al. |
| 12,076,300 B2 | 9/2024 | Schumann et al. |
| 2004/0052731 A1 | 3/2004 | Hirsh et al. |
| 2012/0225949 A1 | 9/2012 | Papalos |
| 2013/0236573 A1 | 9/2013 | Singh et al. |
| 2015/0359759 A1 | 12/2015 | Katz |
| 2015/0374684 A1 | 12/2015 | Javitt |
| 2016/0067196 A1 | 3/2016 | Charney et al. |
| 2016/0332962 A1 | 11/2016 | Chen et al. |
| 2016/0338977 A1 | 11/2016 | Singh et al. |
| 2017/0035707 A1 | 2/2017 | Manthei et al. |
| 2018/0153813 A1 | 6/2018 | Nivorozhkin et al. |
| 2018/0256534 A1 | 9/2018 | Erickson |
| 2018/0325844 A1 | 11/2018 | Brachman et al. |
| 2020/0000748 A1 | 1/2020 | Kagan et al. |
| 2020/0147005 A1 | 5/2020 | Kagan et al. |
| 2022/0125742 A1 | 4/2022 | Kagan et al. |

(Continued)

FOREIGN PATENT DOCUMENTS

| CN | 101466364 A | 6/2009 |
| CN | 104519878 A | 4/2015 |

(Continued)

OTHER PUBLICATIONS

Moaddel et al.; Pharmacology Research & Perspectives; vol. 3, Issue 4; e00157; 10 pages; published 2016.*
Hashimoto, "Rapid-acting antidepressant ketamine, its metabolites and other candidates: A historical overview and future perspective", Psychiatry and Clinical Neurosciences, vol. 73, 2019, pp. 613-627.
Atsushi Hakura, "Genotoxicity Testing", Folia Pharmacol. Jpn., vol. 130, 2007, 57-61.
Declaration of Elena Kagan for U.S. Appl. No. 17/789,631 titled Dosage Regime With Esketamine for Treating Major Depressive Disorder dated Jul. 14, 2024, 415 Pages.
Declaration of Tal Birnberg for U.S. Appl. No. 16/592,930 titled Method of Treating Major Depressive Disorder dated Nov. 24, 2022, 46 Pages.

(Continued)

*Primary Examiner* — Jeffrey T. Palenik
(74) *Attorney, Agent, or Firm* — BakerHostetler

(57) ABSTRACT

The present invention provides a method for safe and efficacious administration of esketamine.

16 Claims, No Drawings

(56) References Cited

U.S. PATENT DOCUMENTS

| | | | |
|---|---|---|---|
| 2023/0063459 A1 | 3/2023 | Schumann et al. | |
| 2023/0233487 A1 | 7/2023 | Kagan et al. | |

FOREIGN PATENT DOCUMENTS

| | | |
|---|---|---|
| CN | 107208133 A | 9/2017 |
| CN | 107735081 A | 2/2018 |
| CN | 107750245 A | 3/2018 |
| DE | 2062620 A1 | 7/1971 |
| DE | 102007009888 A1 | 9/2008 |
| EA | 020339 B1 | 10/2014 |
| GB | 1330878 A | 9/1973 |
| JP | 2016-531913 A | 10/2016 |
| JP | 2018-515557 A | 6/2018 |
| WO | 2007/111880 A2 | 10/2007 |
| WO | 2008/023261 A1 | 2/2008 |
| WO | 2008/033523 A1 | 3/2008 |
| WO | 2011/020061 A2 | 2/2011 |
| WO | 2013/138322 A1 | 9/2013 |
| WO | 2014/006004 A1 | 1/2014 |
| WO | 2014/020155 A1 | 2/2014 |
| WO | 2015/031410 A1 | 3/2015 |
| WO | 2015/051259 A1 | 4/2015 |
| WO | 2015/066172 A1 | 5/2015 |
| WO | 2015/158854 A1 | 10/2015 |
| WO | 2016/044150 A1 | 3/2016 |
| WO | 2016/073653 A1 | 5/2016 |
| WO | 2016/094358 A1 | 6/2016 |
| WO | 2016/187491 A1 | 11/2016 |
| WO | 2017/041112 A1 | 3/2017 |
| WO | 2018/079693 A1 | 5/2018 |
| WO | 2018/102488 A1 | 6/2018 |
| WO | 2018/234568 A2 | 12/2018 |
| WO | 2019/073408 A1 | 4/2019 |
| WO | 2019/126108 A1 | 6/2019 |
| WO | 2020/003195 A1 | 1/2020 |
| WO | 2021/026232 A1 | 2/2021 |
| WO | 2021/116498 A1 | 6/2021 |

OTHER PUBLICATIONS

Diagnostic and Statistical Manual of Mental Disorders, 5th Edition, American Psychiatric Association, 2013, pp. 160-167.
Yehuda et al., "What 1 have changed my mind about and why", European Journal of Psychotraumatology, 2016, 7, 33768.
Zanos Panos, et al: "Ketamine and Ketamine Metabolite Pharmacology: Insights into Therapeutic Mechanisms", Pharmacological Reviews, vol. 70, No. 3, Jun. 26, 2018 (Jun. 26, 2018), pp. 621-660.
Zarate et al 'Replication of Ketamine's Antidepressant Efficacy in Bipolar Depression: A Randomized Controlled Add-on Trial1 Biol Psychiatry. Jun. 1, 2012; 71(11): 939-946.
Zhang et al., "R(-)-ketamine Shows Greater Potency and Longer Lasting Antidepressant Effects Than S (+)-ketamine", Pharmacology, Biochemistry and Behavior, Jan. 2014, 116, 137-141.
Zulresso FDA Label, Full Prescribing Information, Sep. 30, 2019, 21 pages.
"Cortef® brand of hydrocortisone tablets, USP," The Upjohn Company, Nov. 1993, pp. 1-2.
"OxyContin® (oxycodone hydrochloride controlled-release) Tablets, for oral use, CII," Highlights of Prescribing Information, Reference ID: 3155030, Jul. 2012, pp. 1-31.
Avinza® (morphine sulfate) extended-release capsules, for oral use, CII, Highlights of Prescribing Information, Reference ID: 3155722, Jul. 2012, pp. 1-18.
Dahan et al., "Population pharmacokinetic-pharmacodynamic modeling of ketamine-induced pain relief of chronic pain", European Journal of Pain 15, 2011, 258-267.
Gershon, "Adjustment Disorders," Trauma and Stressor Related Disorders, Nov. 17, 2022, pp. 286-289.
Gershon, "Depressive Disorder Due to Another Medical Condition," Depressive Disorder, Nov. 17, 2022, pp. 180-183.

Himmelseher et al., "Ketamine for Perioperative Pain Management", Anesthesiology, Jan. 2005, vol. 102, 211-220.
Janssen Submits Esketamine Nasal Spray New Drug Application to U.S. FDA for Treatment-Resistant Depression, Sep. 4, 2018 [Retrieved from internet https://www.prnewswire.com/news-releases/janssen-submits-esketamine-nasal-spray-new-drug-application-to-us-fda-for-treatment-resistant-depression-300705975.html], 6 pages.
Mathew et al., "Ketamine for Treatment-Resistant Unipolar Depression: Current Evidence", CNS Drugs, Mar. 1, 2012, 26(3), 189-204.
Nair et al., "A Simple Practice Guide for Dose Conversion between animals and human", Journal of Basic and Clinical Pharmacy, 2016, vol. 7, No. 2, pp. 27-31.
NCT02343289, Jan. 21, 2015.
Netherlands Pharmacovigilance Centre report, Esketamine and hepatotoxicity, May 2013, 7 pages.
Noppers et al., "Drug-induced liver injury following a repeated course of ketamine treatment for chronic pain in CRPS type 1 patients: A report of 3 cases"., Pain, 152, 2011, 2179-2178.
Ostuzzi et al., "Antidepressants for the treatment of depression in people with cancer," Cochrane Database of Systematic Reviews, 2018, Issue 4, pp. 1-51.
Ostuzzi et al., "Cochrane Database of Systematic Reviews, Antidepressants for the treatment of depression in people with cancer (Review)", 2018, 1-78.
Patent and Exclusivity for: N211243, Product 001, Esketamine Hydrochloride (Spravato) Spray EQ 28mg Base, Orange Book: Approved Drug Products with Therapeutic Equivalence Evaluations, [Retrieved from internet on Apr. 4, 2023 https://www.accessdata.fda.gov/scripts/cder/ob/patent_info.cfm?Product_No=001&Appl_No=211243&Appl_type=N], 2 pages.
Rot et al., "Safety and Efficacy of Repeated-Dose Intravenous Ketamine for Treatment-Resistant Depression", Biol Psychiatry, 2010, 67, 139-145.
Shiroma et al., "Augmentation of response and remission to serial intravenous subanesthetic ketamine in treatment resistant depression", Journal of Affective Disorders, 155, 2014, 123-129.
Snaith et al., "The hospital anxiety and depression scale", Feb. 1, 1986, vol. 292, 6516, p. 344.
Spravato esketamine nasal spray, Approved Product Monograph, Canada, May 19, 2020, 1-59.
Zhao et al., Simultaneous population pharmacokinetic modelling of ketamine and three major metabolites in patients with treatment-resistant bipolar depression, BJCP, 74:2, 2012, 304-314.
Zigmond et al., "The Hospital Anxiety and Depression Scale," Acta psychiatr. scand., vol. 67, 1983, pp. 361-370.
Feder et al., "Efficacy of Intravenous Ketamine for Treatment of Chronic Posttraumatic Stress Disorder", JAMA Psychiatry, 2014, 71(6), 681-688.
Fond et al' Ketamine's effectiveness in unipolar versus bipolar depression1 Psychopharmacology (2014) 231:4417-4418.
Geisslinger et al., "Pharmacokinetics and Pharmacodynamics of Ketamine Enantiomers in Surgical Patients Using a Stereoselective Analytical Method", British Journal of Anesthesia, 1993, 70, 666-671.
Giorgetti, et al., "Effects of ketamine on psychomotor, sensory and cognitive functions relevant for driving ability", Forensic Science International, 2015, vol. 252, pp. 127-142.
Grady et al1 Ketamine for the treatment of major depressive disorder and bipolar depression: A review of the literature1 Ment Health Clin [Internet], 2017;7(I):16-23.
Grant et al., "Pharmacokinetics and Analgesic Effects of I.M. and Oral Ketamine", British Journal of Anesthesia, 1981, 53, 805-810.
Hagelberg et al., "Clarithromycin, a potent inhibitor of CYP3A, Greatly Increases Exposure to Oral S-ketamine", European Journal of Pain, 2010, 625-629.
Han et al: "Oral scopolamine augmentation for major depression", Expert Rev. Neurother, 2013, 13(1), 19-21.
Hartberg, et al., Psychopharmacology, Impact of oral ketamine augmentation on hospital admissions in treatment-resistant depression and PTSD: a retrospective study, 2018, (393-398), 6 pages.
Hartvig et al., "Central Nervous System Effects of Subdissociative Doses of (S)-ketamine are Related to Plasma and Brain Concen-

(56) References Cited

OTHER PUBLICATIONS trations Measured with Positron Emission Tomography in Healthy Volunteers", Clin. Pharm. & Ther., 1995, 58(2), 165-173.

Hashimoto et al., "R-ketamine: A Rapid-Onset and Sustained Antidepressant Without Risk of Brain Toxicity", Psychological Medicine, Aug. 2016, 46, 2449-2451.

Hasin et al., "Epidemiology of Major Depressive Disorder", Arch. Gen. Psychiatry, 2005, 62, 1097-1106.

Hintzsche, "Subanesthetic-Dose Ketamine to Decrease Emergence Delirium in the Surgical Patient With Posttraumatic Stress Disorder", AANA Journal, Jun. 2018, vol. 86, No. 3, 220-224.

Horn et al., "Understanding resilience: New approaches for preventing and treating PTSD", Experimental Neurology, 2016, 284, 119-132.

Hou et al., "Applying ketamine to alleviate the PTSD-like effects by regulating the HCNI-related BDNF", Progress in Neuropsychopharmacology & Biological Psychiatry, 2018, 86, 313-321.

Huge et al., "Effects of low-dose intranasal (S)-ketamine in patients with Neuropathic pain", European Journal of Pain, 2010, 387-394.

Ihmsen et al., "Stereoselective pharmacokinetics of ketamine: R(-)-Ketamine inhibits the elimination of S(+)-ketamine", Clinical Pharmacology & Therapeutics (2001) 70, 431-438.

Irwin et al., "Daily Oral Ketamine for the Treatment of Depression and Anxiety in Patients Receiving Hospice Care: A 28-Day Open-Label Proof-of-Concept Trail", Journal of Palliative Medicine, 2013, vol. 16, No. 8, 958-965.

Jafarinia, et al., Journal of Affective Disorders, Efficacy and safety of oral ketamine versus diclofenac to alleviate mild to moderate depression in chronic pain patients: A double-blind, randomized, controlled trial 204, 2016, pp. 1-8.

Janssen Announces Results of Esketamine Nasal Spray Phase 3 Study in Patients with Treatment-Resistant Depression, Innovation, Sep. 21, 2018, 6 pages.

Janssen Study for NCT03808259, A Study to Investigate the Different Modes of (S) Ketamine Administration in Healthy Participants, Last Updated Sep. 12, 2019.

Jarventausta et al., "S-ketamine for the Treatment of Depression", Psychiatria Fennica, 2015, 46, 11-20.

Kelley et al., "Open-Label Placebo for Major Depressive Disorder: A Pilot Randomized Controlled Trial," Psychotherapy and Psychosomatics, vol. 81, No. 5, Aug. 2012, pp. 312-314.

Kelmendi et al., "PTSD: from neurobiology to pharmacological treatments", European Journal of Psychotraumatology, 2016, 7, 31858.

Ketamine INN, Update Review Report Agenda Item 6.1, Expert Committee on Drug Dependence, WHO, 37th Meeting, Geneva, Nov. 2015, 46 pgs.

Kharasch et al.,. "Metabolism of Ketamine Stereoisomers by Human Liver Microsomes", Anesthesiology, 1992, 77, 1201-1207.

Kim, "Ketamine for Treatment-Resistant Depression or Post-Traumatic Stress Disorder in Various Settings: A Review of Clinical Effectiveness, Safety, and Guidelines", CADTH Rapid Response Report, Mar. 2017.

Kishimoto et al., Compliance and persistence with daily, weekly, and monthly bisphosphonates for osteoporosis in Japan: analysis of data from the CISA, Arch Osteoporos, 2015, 10:27.

Kraus et al 'Administration of ketamine for unipolar and bipolar depression' Int J Psychiatry Clin Pract. Mar. 2017;21(1):2-12.

Krystal et al., "Synaptic Loss and the Pathophysiology of PTSD: Implications for Ketamine as a Prototype Novel Therapeutic", Curr. Psychiatry, Rep., Apr. 2018, vol. 19(10), 74, pp. 20.

Lara et al 'Antidepressant, mood stabilizing and procognitive effects of very low dose sublingual ketamine in refractory unipolar and bipolar depression' International Journal of Neuropsychopharmacology (2013), 16, 2111-2117.

Lloyd-Williams et al., "A pilotrandomisedcontrolledtrialtoreduces ufferingandemotional distress in patients with advanced cancer", J Affect Dis 2013 148, 141-145.

Lloyd-Williams et al., "Antidepressant medication in patients with advanced cancer-an observational study", QJM Nov. 2013; 106(11):995-1001.

Loebel et al 'Lurasidone Monotherapy in the Treatment of Bipolar 1 Depression: A Randomized, Double-Blind, Placebo-Controlled Study' Am J Psychiatry 2014; 171:160-168.

Ionescu et al 'A single infusion of ketamine improves depression scores in patients with anxious bipolar depression' Bipolar Disord. Jun. 2015; 17(4): 438-443.

Malinosky et al., "Ketamine and Norketamine Plasma Concentrations after i.v., Nasal and Rectal Administration in Children", British Journal of Anaesthesia, 1996, 22, 203-207.

Marcus, S.C. et al., Antipsychotic Adherence and Rehospitalization in Schizophrenia Patients Receiving Oral Versus Long-Acting Injectable Antipsychotics Following Hospital Discharge, JMCP, Sep. 2015, vol. 21, No. 9, p. 764.

McGhee et al., "The correlation between ketamine and post-traumatic stress disorder in burned service members", The Journal of Trauma: Injury, Infection and Critical Care, Feb. 2008, vol. 64, issue 2, p. S195-199.

Mikics et al., "The role of GluN2B-containing NMDA receptors in short- and long-term fear recall", Physiology & Behavior, 2017, 177, 44-48.

Mion et al., "A retrospective study of ketamine administration and the development of acute or post-traumatic stress disorder in 274 war-wounded soldiers", Anaesthesia, 2017, 72, 1476-1483.

Molero et al., "Antidepressant Efficacy and Tolerability of Ketamine and Esketamine: A Critical Review", CNS Drugs, May 2018, 10 pages.

Morrison, et al., Psychopharmacology, Effect of intranasal esketamine on cognitive functioning in healthy participants: a randomized, double-blind, placebo-controlled study, Apr. 2018, 235 (4), pp. 1107-1119.

Mrazek et al., "A Review of the Clinical, Economic, and Societal Burden of Treatment-Resistant Depression: 1996-2013", Psychiatric Services, Aug. 2014, vol. 65, No. 8, 977-987.

Musazzi et al., "What Acute Stress Protocols Can Tell Us About PTSD and Stress-Related Neuropsychiatric Disorders", Frontiers in Pharmacology, Jul. 2018, vol. 9, Article 758.

NCT01998958, Oct. 29, 2015.

NCT02133001, Mar. 18, 2016.

NCT02417064, Apr. 10, 2015.

NCT02418585, Apr. 13, 2015.

NCT02422186, Apr. 16, 2015.

NCT02493868, Jul. 7, 2015.

Assessment Report: Spravato, CHMP, Nov. 21, 2019, 1-175.

Elayan, Center for Drug Evaluations and Research, Appln No. 211243Orig1s000, Non-Clinical Review(s), 2018, 75 pages.

Guidance for Industry, S2(R1) Genotoxicity Testing and Data Interpretation for Pharmaceuticals Intended for Human Use, Jun. 2012, 35pp.

Kagan Declaration, U.S. Appl. No. 18/193,055, entitled "Dosage Regime With Esketamine for Treating Major Depressive Disorder", dated Jul. 18, 2023, 134 pp.

Mathai et al., "The relationship between subjective effects induced by a single dose of ketamine and treatment response in patients with major depressive disorder: A systematic review", vol. 264, Mar. 1, 2020, 123-129.

Peltoniemi et al., "Ketamine: A Review of Clinical Pharmacokinetics and Pharmacodynamics in Anesthesia and Pain Therapy" Clin Pharm, 2016, 55:1059-1077.

NCT02497287, Jun. 10, 2015.

NCT02782104, May 25, 2016.

NCT02918318, Sep. 27, 2016.

NCT03039192, Feb. 1, 2017.

NCT03097133, Mar. 27, 2017.

NCT03185819, Jun. 12, 2017.

NCT03434041, Feb. 18, 2018.

NCT03965871 trial protocol as accessed Jul. 25, 2019.

Norrholm et al., "Fear Extinction in Traumatized Civilians with Posttraumatic Stress Disorder: Relation to Symptom Severity", Biol Psychiatry, 2011, 69556-563.

(56) References Cited

OTHER PUBLICATIONS

Nugent et al 'Neural correlates of rapid antidepressant response to ketamine in bipolar disorder' Bipolar Disord. Mar. 2014 ; 16(2): 119-128.

Och-Ross et al., "Efficacy and Safety of Intranasal Esketamine Plus and Oral Antidepressant in Elderly Patients with Treatment-Resistant Depression", 2018 Annual Meeting of the American Psychiatric Association (APA), May 8, 2018, 2 pages.

Oye et al., "Effects of Ketamine on Sensory Perception: Evidence for a Role of N-Methyl-D-Aspartate Receptors", Journal of Pharmacology and Experimental Therapeutics, Mar. 1992, 260(3), 1209-1213.

Papakostas et al., "The Nature of Placebo Response in Clinical Studies of Major Depressive Disorder", J. Clin. Psychiatry 76:4, 456, Apr. 2015.

Paslakis et al., "Oral Administration of the NMDA Receptor Antagonist S-Ketamine as Add-On Therapy of Depression: A Case Series", Pharmacopsychiatry, Jan. 2010, 43(1), 33-35.

Peltoniemi et al., "Rifampicin has a Profound Effect on the Pharmacokinetics of Oral S-Ketamine and Less on Intravenous S-Ketamine", Basic & Clinical Pharmacology, 2012, 111, 325-332.

Peltoniemi et al., "S-ketamine concentrations are greatly increased by grapefruit juice," European Journal of Clinical Pharmacology, vol. 68, No. 6, Jan. 2012, pp. 979-986.

Pfenninger et al., "Cognitive Impairment after Small-dose Ketamine Isomers in Comparison to Equianalgesic Racemic Ketamine in Human Volunteers", Anesthesiology, 2002, vol. 96, pp. 357-366.

Pradhan et al., "D-Serine is a potential biomarker for clinical response in treatment of posttraumatic stress disorder using (R,S)-ketamine infusion and Timber Psychotherapy: A Pilot Study", BBA—Proteins and Proteomics, 2018, 1866, 831-839.

Preskorn et al: "Randomized Proof of Concept Trial of GLYX-13, an N-Methyl-D-Aspartate Receptor Glycine Site Partial Agonist, in Major Depressive Disorder Nonresponsive to a Previous Antidepressant Agent", Journal of Psychiatric Practice, Mar. 2015, vol. 21, No. 2, 140-149.

Qi et al., "Prevention of Post-Traumatic Stress Disorder After Trauma: Current Evidence and Future Directions", Curr Psychiatry Rep., 2016, 18, 20.

Rasmussen + Feder et al., "Ketamine for Posttraumatic Stress Disorder", JAMA Psychiatry, Jan. 2015, vol. 72, No. 1.

Rayner et al., "Antidepressants for the treatment of depression in palliative care: systematic review and meta-analysis", Palliat Med. Jan. 2011;25(1):36-51.

Reagan-Shaw, et al., Dose translation from animal to human studies revisited, The FASEB Journal, vol. 22, 2007, pp. 659-661.

Rong et al 'Predictors of Response to Ketamine in Treatment Resistant Major Depressive Disorder and Bipolar Disorder' Int. J. Environ. Res. Public Health 2018, 15, 771.

Sanacora, G. et al., A Consensus Statement on the Use of Ketamine in the Treatment of Mood Disorders, JAMA Psychiatry, Apr. 2017, vol. 74, No. 4, 399-405.

Schoevers et al., "Oral Ketamine for the Treatment of Pain and Treatment-Resistant Depression",, British Journal of Psychiatry, 2016, 208, 108-113.

Schonenberg et al., "Effects of peritraumatic ketamine medication on early and sustained posttraumatic stress symptoms in moderately injured accident victims", Psychopharmacology, 2005, vol. 182, pp. 420-425.

Schonenberg et al., "Ketamine aggravates symptoms of acute stress disorder in a naturalistic sample of accident victims", Journal of Psychopharmacology, 2008, 22(5), 493-497.

Segmiller, et al., Repeated S-ketamine Infusions in Therapy Resistant Depression: A Case Series; American College of Clinical Pharmacology, vol. 53, Issue 9, Sep. 2013, pp. 996-998 (5pages).

Sharpe et al., "Major depression in outpatients attending a regional cancer centre: screening and unmet treatment needs", British Journal of Cancer (2004) 90, 314-320.

Shirawi, et al., Journal of Clinical Psychopharmacology, Oral Ketamine in Treatment-Resistant Depression, vol. 37, No. 4, Aug. 2017, pp. 1-4, 464-467.

Singh et al., "Intravenous Esketamine in Adult Treatment-Resistant Depression: A Double-Blind, Double-Randomization, Placebo-Controlled Study", Biological Psychiatry, 2016, 80, 424-431.

Smith-Apeldoorn et al: BMC Psychiatry; "Oral esketamine for treatment-resistant depression: rationale and design of a randomized controlled trial", BMC Psychiatry, vol. 19:375, No. 1, Nov. 29, 2019; XPO55651157; pp. 1-9.

Sofia et al., "Evaluation of Ketamine HCl for Anti-Depressant Activity", Arch. Int. Pharmacodyn. Ther., Mar. 1975, 214(1), 68-74.

Spravato Prescribing Information, Section 2.2, Mar. 2019.

Striebel et al., "(Being with a Buddha): A Case Report of Methoxetamine Use in a United States Veteran with PTSD' Case Reports", Psychiatry, 2017, Article ID 2319094.

Thomas et al 'Rapid effectiveness of intravenous ketamine for ultraresistant depression in a clinical setting and evidence for baseline anhedonia and bipolarity as clinical predictors of effectiveness' J Psychopharmacology 2018 ,vol. 32(10) 1110-1117.

Toyama et al., "Genotoxic Effects of N-nitrosoketamine and Ketamine as Assessed by In Vitro Micronucleus Test in Chinese Hamster Lung Fibroblast Cell Line", Environ. Health Prev. Med., May 2006, 11, 120-127.

Vallesenor et al 'A pilot study of plasma metabolomic patterns from patients treated with ketamine for bipolar depression: evidence for a response-related difference in mitochondrial networks' Br J Pharmacology (2014) 171 2230-2242.

Van de Loo, et al., Psychopharmacology, The effects of intranasal esketamine (84 mg) and oral mirtazapine (30 mg) on on-road driving performance: a double-blind, placebo-controlled study, (2017) 234: 3175-3183.

Vesierra Label, Jan. 2018, 12 pages.

Wallace et al: Randomized, double-blind, placebo-controlled, dose-escalation study: Investigation of the safety, pharmacokinetics, and antihyperalgesic activity of 1-4-chlorokynurenine in healthy volunteer, Scandinavian Journal of Pain, 2017, 17, 243-251.

Wasteson et al., "Depression assessment and classification in palliative cancer patients: a systematic literature review", Palliative Medicine, 2009, vol. 23(8), pp. 739-753.

White et al., "Comparative Pharmacology of the Ketamine Isomers", Brit. Journal Anaesth., 1985, 57, 197-203.

White, et al., "Pharmacology of Ketamine Isomers in Surgical Patients", Anesthesiology, 1980, 52, 231-239.

Wilkinson et al., "A Survey of the Clinical, Off-Label Use of Ketamine as a Treatment for Psychiatric Disorders", Am. J. Psychiatry, Jul. 2017, 174(7), 695.

Witkin Jeffrey M et al: "Rapid-Acting Antidepressants", Current Pharmaceutical Design, vol. 24, No. 22, Jun. 27, 2018 (Jun. 27, 2018), pp. 2556-2563.

Womble, "Effects of Ketamine on Major Depressive Disorder in a Patient With Posttraumatic Stress Disorder", AANA Journal, Apr. 2013, vol. 81, No. 2, pp. 118-119.

Yanagihara et al., "Plasma Concentration Profiles of Ketamine and Norketamine After Administration of Various Ketamine Preparations to Healthy Japanese Volunteers", Biopharmaceutics & Drug Disposition, 2003, 24(1), 37-43.

Yang et al., "R-ketamine: A Rapid-Onset and Sustained Antidepressant Without Psychotomimetic Side Effects", Transl. Psychiatry, Sep. 2015, 11 pages.

"Ketamine as a Rapid Treatment for Post-Traumatic Stress Disorder", Grant No. W81XWH-08-1-0602, U.S. Army Medical Research and Material Command, Oct. 2011.

"Major Depressive Disorder: Developing Drugs for Treatment Guidance for Industry"; U.S. Dept. of Health and Human Services Food and Drug Administration;—Center for Drug Evaluation and Research; Revision 1; Jun. 2018; 11 pages.

2019 FDA Esketamine Briefing Document, Esketamine Nasal Spray for Patients with Treatment-resistant Depression, Janssen Research & Development, LLC, Feb. 8, 2019, 1-260.

Adhvaryu et al., "Genotoxic Effects of Ketamine on CHO Cells", Arch. Toxicology, 1986, vol. 59, pp. 124-125.

(56) References Cited

OTHER PUBLICATIONS

Alberich et al 'Efficacy and safety of ketamine in bipolar depression: A systematic review' Rev Psiquiatr Salud Ment (Bare.), May 2017; vol. 10(2), pp. 104-112.

Albott et al., "Efficacy, safety and durability of repeated ketamine infusions for comorbid posttraumatic stress disorder and treatment depression", J. Clin. Psychiatry, 2018, vol. 79(3), 11634, pp. 8.

Allergan Study for NCT03726658, AGN-241751 in the Treatment of Major Depressive Disorder, Last Updated on Oct. 8, 2019.

Angst et al., Differential psychopathology and patterns of cerebral glucose utilisation produced by (S)- and (R)-ketamine in healthy volunteers using positron emission tomography (PET), European Neuropsychopharmacology 7, Jul. 1997, pp. 25-38.

Anonymous: "Trial NL6030 (NTR6161) Ketaminestudie", Netherlands Trial register Oct. 21, 2016 (Oct. 21, 2016), pp. 1-6, XP002796356, Retrieved from the Internet: URL:https://www.trialregister.nl/trial/6030.

APA Annual Meeting Poster P7-065, Mar. 18, 2018.

APA Annual Meeting Poster P8-054, Mar. 18, 2018.

Arabzadeh, et al., Journal of Affective Disorders, Does oral administration of ketamine accelerate response to treatment in major depressive disorder? Results of a double-blind controlled trial, Journal of Affective Disorders, https://doi.org/10.1016/j.jad.2018.02.056, 26 pages, Feb. 2018, pp. 236-241.

ASCP Annual Meeting Poster T67, May 29, 2018.

ASCP Annual Meeting Poster W68, May 29, 2018.

Averill et al., "Glutamate dysregulation and glutamatergic therapeutics for PTSD: Evidence from human studies", Neuroscience Letters, 2017, vol. 649, pp. 147-155.

Banwani et al., "Ketamine-induced affective switch in a patient with treatment-resistant depression", Indian J Pharmacol., Jul.-Aug. 2015; vol. 47(4): pp. 454-455.

Berman et al., "Antidepressant Effects of Ketamine in Depressed Patients", Biol. Psychiatry, 2000, pp. 351-354.

Bioequivalence Studies with Pharmacokinetic Endpoints for Drugs Submitted Under and ANDA Guidance for Industry, Aug. 2021.

Blonk et al., "Use of Oral Ketamine in Chronic Pain Management: A Review", European Journal of Pain, 2010, 466-472.

Bobo et al 'Ketamine for treatment-resistant unipolar and bipolar major depression: critical review and implications for clinical practice' Depression and Anxiety, vol. 33, Jan. 2016, pp. 698-710.

Body Weight at www.cnn.com/2018/12/20/health/us-average-height-weight-report/index.html (retrieved from the internet Aug. 25, 2021) (Year: 2018).

Branerjee et al., "AGN-241751, an Orally Bioavailable Positive NMDA Receptor Modulator, Exhibits Rapid and Sustained Antidepressant-Like Effects in Rodents", Biological Psychiatry, May 15, 2019, vol. 85, S348.

Brennan et al., "The comparative pharmacokinetics of physical manipulation by crushing of XtampzaR ER compared with OxyContin", Future Medicine Ltd., Sep. 18, 2017, 12 pages.

Calabrese et al 'A Randomized, Double-Blind, Placebo-Controlled Trial of Quetiapine in the Treatment of Bipolar 1 or II Depression' Am J Psychiatry 2005; 162:1351-1360.

Canuso et al., "Efficacy and Safety of Intranasal Esketamine for the Rapid Reduction of Symptoms of Depression and Suicidality in Patients at Imminent Risk for Suicide: Results of a Double-Blind, Randomized, Placebo-Controlled Study", The American Journal of Psychiatry, Jul. 2018, vol. 175:7, pp. 620-630.

Celon Pharma Press Release, Celon Pharma S.A. begins a clinical programme for Esketamine in the treatment of drug-resistant depression, Nov. 28, 2017.

Celon Pharma Press Release, Completed administration of the Esketamine-based drug to all subjects of the first part of the phase 1 trial; Jan. 5, 2018.

Chedekel, Yale, "Magic" Antidepressant May Hold promise for PTSD, Harvard Courant, Jun. 3, 2012.

Chen et al., "Therapeutic effects of add-on low-dose dextromethorphan plus valproic acid in bipolar disorder", European Neuropsychopharmacology, Sep. 2014, vol. 24, pp. 1753-1759.

Chong et al., "Development of a Sublingual/Oral Formulation of Ketamine for Use in Neuropathic Pain", Clin Drug Invest 2009; 29 (5): 317-324.

Clements et al., "Bioavailability, Pharmacokinetics and Analgesic Activity of Ketamine in Humans", Journal of Pharmaceutical Sciences, May 1982, 539-542.

Correia-Melo et al 'Rapid infusion of esketamine for unipolar and bipolar depression: a retrospective chart review' Neuropsychiatric Disease and Treatment 2017:13 1627-1632.

Currie, G.M., "Pharmacology, Part 1: Introduction to Pharmacology and Pharmacodynamics," Journal of Nuclear Medicine Technology, vol. 46, No. 2, Jun. 2018, pp. 81-86.

D'Andrea et al., "Transient Resolution of Treatment-Resistant Posttraumatic Stress Disorder Following Ketamine Infusion", Biol Psy, 2013, 74: e-13-e14.

Daly et al., "A Randomized Withdrawal, Double-Blind, Multicenter Study of Esketamine Nasal Spray Plus an Oral Antidepressant for Relapse Prevention in Treatment-Resistant Depression", Presented at the 2018 Annual Meeting of the American Society of Clinical Psychopharmacology (ASCP), May 30, 2018, 1 page.

Daly et al., "Efficacy and Safety of Intranasal Esketamine Adjunctive to Oral Antidepressant Therapy in Treatment-Resistant Depression", JAMA Psychiatry, Dec. 2017, 75(2), 139-148.

Daly et al., "Intranasal Esketamine in Treatment-Resistant Depression, a Dose Response Study—Double Blind and Open Label Extension Data", Neuropsychopharmacology, 2015, 40, S272-S442, S340.

Diazgranados et al 'A Randomized Add-on Trial of an N-methyl-D-aspartate Antagonist in Treatment-Resistant Bipolar Depression' Arch Gen Psychiatry. Aug. 2010; 67(8) 793-802.

Domino, "Taming the Ketamine Tiger", Anesthesiology, 2010, 113, 678-686.

Donoghue et al., "Remission From Behavioral Dysregulation in a Child With PTSD After Receiving Procedural Ketamine", Pediatrics, 2015, 136, e694.

DSM-V "Major Depressive Disorder", 2013, at p. 161.

Durgam et al 'An 8-Week Randomized, Double-Blind, Placebo-Controlled Evaluation of the Safety and Efficacy of Cariprazine in Patients With Bipolar 1 Depression' Am J Psychiatry 2016; 173:271-281.

Earley et al 'Cariprazine Treatment of Bipolar Depression :A Randomized Double-Blind Placebo-Controlled Phase 3 Study' Am J Psychiatry Jun. 1, 2019;176(6):439-448.

Ebert et al., "Norketamine, The Main Metabolite of Ketamine, is a non-competitive NMDA Receptor Antagonist in the Rat Cortex and Spinal Cord", European Journal of Pharmacology, 1997, 333, 99-104.

EMCDDA, Report on the Risk Assessment of Ketamine in the Framework of the Joint Action on New Synthetic Drugs, 2002, 120 pages.

European Monitoring Centre for Drug and Drug Addition's 2002 risk assessment report of Ketamine, p. 49-50.

Fanta et al., "Population Pharmacokinetics of S-ketamine and Norketamine in Healthy Volunteers After Intravenous and Oral Dosing", Eur. J. Clin. Pharmacol., Mar. 1, 2015, vol. 71, No. 4, pp. 441-447.

Fava et al: "Opioid Modulation With Buprenorphine/Samidorphan as Adjunctive Treatment for Inadequate Response to Antidepressants: A Randomized Double-Blind Placebo-Controlled Trial", Am. J. Psychiatry, May 2016, 173, 499-508.

Fava, et al., "Major Depressive Disorder", Neuron, Nov. 2000, vol. 28, 335-341.

FDA Major Depressive Disorder: Developing Drugs for Treatment, Guidance for Industry, Jun. 2018.

\* cited by examiner

DOSAGE REGIME WITH ESKETAMINE FOR TREATING NEUROPSYCHIATRIC OR NEUROLOGICAL CONDITIONS

CROSS-REFERENCE TO RELATED APPLICATIONS

This application is the National Stage Application of International Patent Application No. PCT/IB2020/062508, filed Dec. 29, 2020, which claims the benefit of priority to U.S. Provisional Application No. 62/954,790, filed Dec. 30, 2019, the entire contents of both of which are incorporated herein by reference.

FIELD OF THE INVENTION

The present disclosure provides methods for safe and efficacious administration of esketamine.

BACKGROUND OF THE INVENTION

Ketamine is a non-barbiturate, rapid acting, induction and general anesthetic agent that acts primarily via NMDA receptor antagonism in the CNS. The drug has been available in the United States since 1970 under the tradename Ketalar®. In 1971, DE2062620 described ketamine's (−) enantiomer, esketamine. Esketamine is available in Europe as an induction and general anesthetic agent under the tradename Ketanest® S and in the US as a nasal spray, to be used in conjunction with an oral antidepressant, to treat treatment-resistant depression under the tradename Spravato®.

Sofia et al (1975) proposed the use of oral ketamine to treat depression. Berman et al (1980) described the results of a placebo controlled clinical trial of a single intravenous dose of ketamine in 7 patients with major depression. DE102007009888 suggests the use of (S)(+)-ketamine in the treatment of depression. More recently, there has been an increased interest in the possibility of using ketamine or esketamine for the treatment of major depressive disorder (MDD) including when the depression has proved refractory to other therapies leading, in 2019, to a first marketing approval for the enantiomer to treat depression.

Ketamine and esketamine have also been investigated in a variety of other neurological and psychiatric conditions. Amongst these investigations, Diazgranados et al (2010) demonstrated a robust and rapid effect of intravenous ketamine in bipolar disorder, Glue et al (2019) found an improvement in anxiety ratings within an hour of ketamine dosing which persisted for up to a week in treatment-refractory Generalized Anxiety and Social Anxiety Disorder patients, Sherman et al (2016) found that ketamine could reduce levodopa induced dyskinesia in Parkinson's disease sufferers and Marchetti et al (2015) showed that oral ketamine could reduce chronic pain.

Pharmaceutical compositions of ketamine and esketamine have been administered to healthy subjects and patients via a variety of roots of administration including intravenously, intranasally and orally. Clements et al (1982) record the relative bioavailability of oral ketamine as being 17% and of intramuscular ketamine as being 93%. Since that article, several other studies have recorded the relative oral bioavailability of ketamine as being between 17 and 24%. Malinovsky et al (1996) record the relative bioavailability of intranasal ketamine as being 50% and of rectal ketamine as being 30%. Yanagihara et al (2003) record the relative bioavailability of both rectal and sublingual ketamine as being 30%, whereas they found nasal bioavailability to be 45%.

Although esketamine has been available for more than 40 years, there is very little published literature into its relative bioavailability by non-intravenous routes. Peltoniemi et al (2012) record the oral bioavailability of esketamine as being 11%, whereas Fanta et al (2015) found it to be only 8% and suggest that the first-pass metabolism of esketamine is more extensive than that found with ketamine. Unfortunately, although the protocol of a study into the relative bioavailability of intranasal and oral esketamine, NCT02343289, was already described in 2015, no results have been published. WO2019126108 discloses that 56 mg and 84 mg administered intranasally produces plasma esketamine levels at or above the range achieved by an intravenous administration of 0.2 mg/kg of esketamine, suggesting that the relative bioavailability of intranasal esketamine might be lower than that of ketamine.

The relative efficacy and safety of the two enantiomers of ketamine has also been a source of considerable debate in the literature. Ebert et al (1997) record that esketamine has a 5 times greater affinity for the NMDA receptor than (R)-ketamine. Oye et al (1992) record that esketamine was 4 times as potent as (R)-ketamine in reducing pain perception and in causing auditory and visual disturbances. Domino (2010) records that although esketamine appears more potent than (R)-ketamine, it also presents with greater undesirable psychotomimetic side effects. In contrast, Zhang et al (2014) and Yang et al (2015) have recorded that (R)-ketamine showed greater potency and longer-lasting antidepressant effects than esketamine in animal models of depression without psychotomimetic side effects and abuse liability. This has led some, such as Hashimoto (2016), to suggest that the anti-depressive effect of these molecules might not be due to NMDA receptor antagonism.

Despite the more recent interest in the use of ketamine and its enantiomers in the treatment of depression, most clinical reports describe the effects after a single administration. Blonk et al (2010) provide an extensive review of the doses recorded for chronic administration of oral ketamine in pain therapy and shows that typically high doses of 200 mg/d or more were prescribed for time periods of up to and greater than a year. Paslakis et al (2010) record four case reports of administering up to 1.25 mg/kg/d of oral esketamine as concomitant therapy in patients suffering from depression over a 14 day timeframe with two patients receiving up to 150 mg/d for 7 of their treatment days.

Surprisingly, it has now been found that chronic administration of high levels of esketamine is associated with an increased risk of mutagenicity and therefore, circulating blood levels of the drug should be limited for administration of esketamine in particular when administered in an oral dosage form.

SUMMARY OF THE INVENTION

In one embodiment, the invention relates to a method of treating a condition other than major depressive disorder (MDD) in a human patient in need thereof comprising orally administering to said patient an oral dosage form comprising between about 5 mg and about 40 mg of esketamine over a treatment regimen of at least 28 days.

DETAILED DESCRIPTION OF THE INVENTION

The present invention is directed to methods of treating a condition other than major depressive disorder in a human patient in need thereof comprising orally administering to said patient an oral dosage form comprising about 5 mg to about 40 mg (e.g., 5 mg to 40 mg) of esketamine over a treatment regimen of at least 28 days.

As used herein, the term "major depressive disorder", or MDD, is characterized as a psychiatric disorder meeting five criteria: 1) the presence during the same 2 week period which together represent a change from previous functioning, of a depressed/sad mood or a loss of interest and pleasure, together with five (or more) of the following additional criteria occurring nearly every day i) depressed/sad mood ii) loss of interest and pleasure iii) significant weight loss when not dieting or weight gain or a decrease or increase in appetite iv) insomnia or hypersomnia v) psychomotor agitation or retardation vi) fatigue or loss of energy vii) feelings of worthlessness or excessive or inappropriate guilt viii) diminished ability to think or concentrate or indecisiveness ix) recurrent thoughts of death or suicidal ideation, planning or attempt: 2) the symptoms cause clinically significant distress or impairment in social, occupational or other functioning: 3) the episode is not better accounted for by a psychotic disorder: 4) the episode is not attributable to the physiological effects of a substance or to another medical condition: 5) there has never been a manic or hypomanic episode (Diagnostic and Statistical Manual of Mental Disorders, 5th Edition, American Psychiatric Association, 2013).

In one embodiment, the condition other than major depressive disorder is a neuropsychiatric condition and/or a neurological condition.

In one embodiment, the neuropsychiatric condition is selected from the group consisting of acute stress disorder, alcohol dependence disorder, alcohol use disorder, anorexia nervosa, anxiety disorders, bipolar disorder, borderline personality disorder, bulimia nervosa, PMDD, schizoaffective disorder and schizophrenia.

In one embodiment, the neurological condition is selected from the group consisting of ALS, Alzheimer's disease, chronic fatigue, diabetic neuropathy, dyskinesia, fibromyalgia, opioid tolerance, pain and traumatic brain injury.

Unless noted otherwise, as used herein, the term "neuropsychiatric condition" shall refer to a psychiatric condition as catalogued and characterized by the American Psychiatric Association's Diagnostic and Statistical Manual of Mental Disorders fifth edition 2013 (DSM-5).

As used herein, the term "acute stress disorder" shall refer to a neuropsychiatric condition in which an individual has been exposed to actual or threatened death, serious injury and/or sexual violation and presenting with symptoms of intrusion, negative mood, dissociation, avoidance, and arousal lasting from 3 days to 1 month following exposure to the traumatic events.

As used herein, the term "treating acute stress disorder" can refer to a reduction of the symptoms of acute stress. In some aspects, treating acute stress disorder refers to a decrease in Clinician-Administered PTSD Scale for DSM-5 (CAPS-5) score, an increase in time to worsening of Clinician-Administered PTSD Scale for DSM-5 (CAPS-5) score, a decrease in Posttraumatic Stress Disorder Checklist for DSM-5 (PCL-5) score, an increase in time to worsening of Posttraumatic Stress Disorder Checklist for DSM-5 (PCL-5) score, a decrease in Posttraumatic Diagnostic Scale-5 (PDS-5) score, an increase in time to worsening of Posttraumatic Diagnostic Scale-5 (PDS-5) score, a decrease in PTSD Symptom Scale-Interview for DSM-5 (PSS-I-5) score, an increase in time to worsening of PTSD Symptom Scale-Interview for DSM-5 (PSS-I-5) score, a decrease in National Stressful Events Survey Acute Stress Disorder Short (NSESSS) score, an increase in time to worsening of National Stressful Events Survey Acute Stress Disorder Short (NSESSS) score, a decrease in Beck Anxiety Inventory (BAI) score, an increase in time to worsening of Beck Anxiety Inventory (BAI) score, an increase in the number of patients reaching remission, a decrease in the number of DSM-5 diagnostic criteria and/or a decrease in the frequency of presentation of DSM-5 diagnostic criteria.

As used herein, the term "alcohol dependence disorder" shall refer to a neuropsychiatric condition in which an individual is physically or psychologically dependent upon alcohol, as catalogued and characterized by the American Psychiatric Association's Diagnostic and Statistical Manual of Mental Disorders fourth edition 1995 (DSM-4).

As used herein, the term "treating alcohol dependence disorder" can refer to a reduction of the symptoms of alcohol dependence. In some aspects, treating alcohol dependence refers to a decrease in the number of Heavy Drinking Days (HDDs) from baseline, an increase in alcohol abstinence rates, a reduction in Drinking Risk Level (RSDRL) response, a decrease in the World Health Organization (WHO) Drinking Risk Category of at least one level, a decrease in the percentage of days abstinent alcohol per week, a decrease in the percentage of days of heavy drinking per week, a decrease in the mean number of drinks per week, a decrease in Alcohol Craving Scale—Short Form (ACQ-SR-R) score, an increase in time to worsening of Alcohol Craving Scale—Short Form (ACQ-SR-R) score, a decrease in Alcohol Related Consequences (ImBIBe) score, an increase in time to worsening of Alcohol Related Consequences (ImBIBe) score, an increase in the number of patients reaching remission, a decrease in the number of DSM-4 diagnostic criteria, a decrease in the frequency of presentation of DSM-4 diagnostic criteria and/or a decrease in the change from baseline in the monthly Total Alcohol Consumption (TAC).

As used herein, the term "alcohol use disorder" can refer to a neuropsychiatric condition in which an individual partakes in heavy alcohol use and suffers from a loss of control over alcohol intake.

As used herein, the term "treating alcohol use disorder" can refer to a reduction of the symptoms of alcohol dependence. In some aspects, treating alcohol dependence refers to a reduction in the number of Heavy Drinking Days (HDDs) from baseline, an increase in alcohol abstinence rates, a decrease in Drinking Risk Level (RSDRL) response, a decrease in the World Health Organization (WHO) Drinking Risk Category of at least one level, a decrease in the percentage of days abstinent alcohol per week, a decrease in the percentage of days of heavy drinking per week, a decrease in the mean number of drinks per week, a decrease in Alcohol Craving Scale—Short Form (ACQ-SR-R) score, an increase in time to worsening of Alcohol Craving Scale—Short Form (ACQ-SR-R) score, a decrease in Alcohol Related Consequences (ImBIBe) score, an increase in time to worsening of Alcohol Related Consequences (ImBIBe) score, an increase in the number of patients reaching remission, a decrease in the number of DSM-5 diagnostic criteria, a decrease in the frequency of presentation of DSM-5 diagnostic criteria and/or a decrease in the change from baseline in the monthly Total Alcohol Consumption (TAC).

As used herein, the term "anorexia nervosa" can refer to a neuropsychiatric condition in which an individual suffers from persistent energy intake restriction, intense fear of gaining weight or of becoming fat, or persistent behavior that interferes with weight gain, and a disturbance in self-perceived body weight or shape.

As used herein, the term "treating anorexia nervosa" can refer to a reduction of the symptoms of anorexia nervosa. In some aspects, treating anorexia nervosa refers to an increase from baseline in body weight, an increase from baseline in appetite, an increase in Body Mass Index (BMI), a decrease in the obsessions subscale of the Yale-Brown Obsessive Compulsive Scale score, an increase in time to worsening of obsessions subscale of the Yale-Brown Obsessive Compulsive Scale score, a decrease in Eating Disorder Inventory Drive for Thinness subscale score, an increase in time to worsening of Eating Disorder Inventory Drive for Thinness subscale score, a decrease in Eating Disorder Inventory (EDI) score for Body Dissatisfaction, an increase in time to worsening of Eating Disorder Inventory (EDI) score for Body Dissatisfaction, a decrease in Ease of Eating Scale (EOES) score, an increase in time to worsening of Ease of Eating Scale (EOES) score, a decrease in the time to Reach 90% Ideal Body Weight (IBW) and maintain said weight for one month, an increase in the number of patients reaching remission, a reduction in Eating Disorders Examination Questionnaire (EDE-Q) score, a decrease in the number of DSM-5 diagnostic criteria, a decrease in the frequency of presentation of DSM-5 diagnostic criteria and/or an increase in time to worsening of Eating Disorders Examination Questionnaire (EDE-Q) score.

As used herein, the term "anxiety disorders" refers to neuropsychiatric conditions that share features of excessive fear and/or anxiety and related behavioral disturbances. In one embodiment, anxiety disorders include Generalized Anxiety Disorder, Social Anxiety Disorder, agoraphobia, Panic Disorder and phobias.

As used herein, the term "treating anxiety disorders" refers to a reduction in the symptoms of anxiety disorders. In some aspects, treating anxiety disorders refers to the treatment of Generalized Anxiety Disorder. In other aspects, treating anxiety disorders refers to the treatment of Social Anxiety Disorder. In other aspects, treating anxiety disorders refers to the treatment of agoraphobia. In other aspects, treating anxiety disorders refers to the treatment of Panic Disorder. In other aspects, treating anxiety disorders refers to the treatment of specific phobias.

As used herein, the term "treating Generalized Anxiety Disorder" can refer to a reduction of the symptoms of Generalized Anxiety Disorder. In some aspects, treating Generalized Anxiety Disorder refers to a decrease in Hamilton Anxiety Scale (HAM-A) score, an increase in time to worsening of Hamilton Anxiety Scale (HAM-A) score, a decrease in Hospital Anxiety and Depression (HAD) anxiety subscale score, an increase in time to worsening of Hospital Anxiety and Depression (HAD) anxiety subscale score, an increase in the percentage of responders in HAM-A, an increase in the number of patients reaching remission, a decrease in Generalized Anxiety Disorder 7 items scale (GAD-7) score, an increase in time to worsening of Generalized Anxiety Disorder 7 items scale (GAD-7) score, a decrease in 36-Item Short-Form Health Survey (SF-36) Social Functioning subscore, a decrease in the number of DSM-5 diagnostic criteria, a decrease in the frequency of presentation of DSM-5 diagnostic criteria and/or an increase in time to worsening of 36-Item Short-Form Health Survey (SF-36) Social Functioning subscore.

As used herein, the term "treating Social Anxiety Disorder" can refer to a reduction of the symptoms of Social Anxiety Disorder. In some aspects, treating Social Anxiety Disorder refers to a decrease in Liebowitz Social Anxiety Scale (LSAS) score, an increase in time to worsening of Liebowitz Social Anxiety Scale (LSAS) score, a decrease in Brief Social Phobia Scale (BSPS) score, an increase in time to worsening of Brief Social Phobia Scale (BSPS) score, a decrease in Marks Fear questionnaire social anxiety subscore, an increase in time to worsening of Marks Fear questionnaire social anxiety subscore, a decrease in Fear of Negative Evaluation (FNE) score, an increase in time to worsening of Fear of Negative Evaluation (FNE) score, a decrease in Albany Panic and Phobia Questionnaire (APPQ) Social Anxiety subscore, an increase in time to worsening of Albany Panic and Phobia Questionnaire (APPQ) Social Anxiety subscore, an increase in the number of patients reaching remission, a decrease in Social Avoidance and Distress Scale (SADS) score, a decrease in the number of DSM-5 diagnostic criteria, a decrease in the frequency of presentation of DSM-5 diagnostic criteria and/or an increase in time to worsening of Social Avoidance and Distress Scale (SADS) score.

As used herein, the term "treating agoraphobia" can refer to a reduction of the symptoms of agoraphobia. In some aspects, treating agoraphobia refers to a decrease in Panic and Agoraphobia Scale (PAS) score, an increase in time to worsening of Panic and Agoraphobia Scale (PAS) score, a decrease in Albany Panic and Phobia Questionnaire (APPQ) agoraphobia subscore, an increase in time to worsening of Albany Panic and Phobia Questionnaire (APPQ) agoraphobia subscore, an increase in the number of patients reaching remission, a decrease in Ost Agoraphobia Scale (AS) score, a decrease in the number of DSM-5 diagnostic criteria, a decrease in the frequency of presentation of DSM-5 diagnostic criteria and/or an increase in time to worsening of Ost Agoraphobia Scale (AS) score.

As used herein, the term "treating Panic Disorder" can refer to a reduction of the symptoms of Panic Disorder. In some aspects, treating Panic Disorder refers to a reduction in the frequency of panic attacks, a reduction in the duration of panic attacks, a decrease in Panic Disorder Severity Scale (PDSS) score, an increase in time to worsening of Panic Disorder Severity Scale (PDSS) score, an increase in the number of patients reaching remission, a decrease in Albany Panic and Phobia Questionnaire (APPQ) Panic Disorder subscore, a decrease in the number of DSM-5 diagnostic criteria, a decrease in the frequency of presentation of DSM-5 diagnostic criteria and/or an increase in time to worsening of Albany Panic and Phobia Questionnaire (APPQ) Panic Disorder subscore.

As used herein, the term "treating phobias" can refer to a reduction of the symptoms of a phobia. In some aspects, treating phobias refers to a decrease in VAS-Anxiety score, an increase in time to worsening of VAS-Anxiety score, a decrease in State-Trait Anxiety Inventory (STAI) score, an increase in time to worsening of State-Trait Anxiety Inventory (STAI) score, a decrease in Beck Anxiety Inventory (BAI) score, an increase in time to worsening of Beck Anxiety Inventory (BAI) score, a decrease in Fairbrother and Antony Specific Phobia Questionnaire (SPQ) score, an increase in time to worsening of Fairbrother and Antony Specific Phobia Questionnaire (SPQ) score, a decrease in Acute Panic Inventory (API) score, an increase in time to worsening of Acute Panic Inventory (API) score, a decrease in Profile of Mood States (POMS) score, an increase in time to worsening of Profile of Mood States (POMS) score, an increase in the number of patients reaching remission, a decrease in Marks Main Phobia Questionnaire score, a decrease in the number of DSM-5 diagnostic criteria, a decrease in the frequency of presentation of DSM-5 diagnostic criteria and/or an increase in time to worsening of Marks Main Phobia Questionnaire score.

The present invention is further directed to methods of treating bipolar disorder in a human patient in need thereof comprising orally administering to said patient an oral dosage form comprising about 5 mg to about 40 mg (e.g., 5 mg to 40 mg) of esketamine over a treatment regimen of at least 28 days.

As used herein, the term "bipolar disorder" can refer to a neuropsychiatric disorder in which an individual suffers from significant mood episodes including mania and/or hypomania and/or depression and with, or without, mixed features (Diagnostic and Statistical Manual of Mental Disorders, 5th Edition, (DSM-V) American Psychiatric Association, 2013). In one embodiment, bipolar disorder includes bipolar I disorder, bipolar II disorder and cyclothymic disorder.

As used herein, the term "bipolar I disorder" is characterized as a psychiatric disorder comprising a manic episode wherein the manic episode may have been preceded by and/or followed by hypomanic and/or major depressive episodes.

As used herein, the term "bipolar II disorder" is characterized as a psychiatric disorder comprising a current, or past, hypomanic episode and a current, or past, major depressive episode.

As used herein, the term "mood episode" is a cluster of symptoms that occur for a discreet period of time, is typically associated with bipolar disorder and includes manic episodes, hypomanic episodes and major depressive episodes.

As used herein, the term "manic episode" comprises four criteria: 1) a distinct period of abnormally and persistently elevated, expansive, or irritable mood and abnormally and persistently increased goal-directed activity or energy, lasting at least one week and present most of the day, nearly every day or of any duration if hospitalization is necessary; 2) during the period of mood disturbance and increased energy or activity, three or more of the following symptoms (four if the mood is only irritable) are present to a significant degree and represent a noticeable change from usual behavior: i) inflated self-esteem or grandiosity, ii) decreased need for sleep, iii) more talkative than usual or pressure to keep talking, iv) flight of ideas or subjective experience that thoughts are racing, v) distractibility as reported or observed, vi) increase in goal-directed activity, either socially, at work or school, or sexually or psychomotor agitation and vii) excessive involvement in activities that have a high potential for painful consequences; 3) the mood disturbance is sufficiently severe to cause marked impairment in social or occupational functioning or to necessitate hospitalization to prevent harm to self or others, or there are psychotic features; and, 4) the episode is not attributable to the physiological effects of a substance or to another medical condition.

As used herein, the term "hypomanic episode" comprises six criteria: 1) a distinct period of abnormally and persistently elevated, expansive, or irritable mood and abnormally and persistently increased activity or energy, lasting at least four consecutive days and present most of the day, nearly every day; 2) during the period of mood disturbance and increased energy and activity, three or more of the following symptoms (four if the mood is only irritable) have persisted, represent a noticeable change from usual behavior, and have been present to a significant degree: i) inflated self-esteem or grandiosity, ii) decreased need for sleep, iii) more talkative than usual or pressure to keep talking, iv) flight of ideas or subjective experience that thoughts are racing, v) distractibility as reported or observed, vi) increase in goal-directed activity either socially, at work or school, or sexually or psychomotor agitation and vii) excessive involvement in activities that have a high potential for painful consequences; 3) the episode is associated with an unequivocal change in functioning that is uncharacteristic of the individual when not symptomatic; 4) the disturbance in mood and the change in functioning are observable by others; 5) the episode is not severe enough to cause marked impairment in social or occupational functioning or to necessitate hospitalization; and, 6) the episode is not attributable to the physiological effects of a substance.

As used herein, the term "major depressive episode" comprises three criteria: 1) five or more of the following symptoms have been present during the same two-week period and represent a change from previous functioning and wherein at least one of the symptoms is either (1) depressed mood or (2) loss of interest or pleasure and do not include symptoms that are clearly attributable to another medical condition: i) depressed mood most of the day, nearly every day, as indicated by either subjective report or observation made by others, ii) markedly diminished interest or pleasure in all, or almost all, activities most of the day, nearly every day as indicated by either subjective account or observation, iii) significant weight loss when not dieting or weight gain or a decrease or increase in appetite nearly every day, iv) insomnia or hypersomnia nearly every day, v) psychomotor agitation or retardation nearly every day which is observable by others and not merely subjective feelings of restlessness or being slowed down, vi) fatigue or loss of energy nearly every day, vii) feelings of worthlessness or excessive or inappropriate guilt, which may be delusional, nearly every day and not merely self-reproach or guilt about being sick, viii) diminished ability to think or concentrate, or indecisiveness, nearly every day either by subjective account or as observed by others and ix) recurrent thoughts of death and not just fear of dying, recurrent suicidal ideation without a specific plan, or a suicide attempt or a specific plan for committing suicide; 2) the symptoms cause clinically significant distress or impairment in social, occupational, or other important areas of functioning; and, 3) the episode is not attributable to the physiological effects of a substance or another medical condition.

As used herein, the term "cyclothymic disorder" is characterized as a psychiatric disorder comprising five criteria: 1) for at least two years there have been numerous periods with hypomanic symptoms that do not meet criteria for a hypomanic episode and numerous periods with depressive symptoms that do not meet criteria for a major depressive episode and wherein said symptoms are not better explained by schizoaffective disorder, schizophrenia, schizophreniform disorder, delusional disorder, or other specified or unspecified schizophrenia spectrum or other psychotic disorders; 2) during said two-year period, the hypomanic and depressive periods have been present for at least half the time and the individual has not been without the symptoms for more than two months at a time; 3) the criteria for a major depressive, manic, or hypomanic episode have never been met; 4) the symptoms are not attributable to the physiological effects of a substance or another medical condition; and, 5) the symptoms cause clinically significant distress or impairment in social, occupational, or other important areas of functioning.

In one embodiment, the bipolar disorder is with anxious distress. In another embodiment, the disorder is with mixed features. In another embodiment, the disorder is with melancholic features. In another embodiment, the disorder is with atypical features. In another embodiment, the disorder is with mood-congruent psychotic features. In another embodiment, the disorder is with mood-incongruent psychotic features. In another embodiment, the disorder is with catatonia. In another embodiment, the disorder is with peripartum onset. In another embodiment, the disorder is with seasonal pattern.

As used herein, the term "treating bipolar disorder" can refer to a reduction and/or prevention of the symptoms of bipolar disorder. In some aspects, treating bipolar disorder refers to the treatment of bipolar I disorder. In other aspects, treating bipolar disorder refers to the treatment of bipolar II disorder. In other aspects, treating bipolar disorder refers to the treatment of cyclothymic disorder. In some aspects, treating bipolar disorder can refer to maintenance therapy of bipolar disorder. In other aspects, treating bipolar disorder can refer to the treatment of major depressive episodes, and their symptoms, as associated with bipolar disorder. In some aspects, treating bipolar disorder refers to a decrease in Montgomery-Åsberg Depression Rating Scale (MADRS) score in patients suffering from bipolar disorder, an increase in time to worsening of Montgomery-Åsberg Depression Rating Scale (MADRS) score in patients suffering from bipolar disorder, a decrease in Hamilton Depression Rating Scale score in patients suffering from bipolar disorder, an increase in time to worsening of Hamilton Depression Rating Scale score in patients suffering from bipolar disorder, a decrease in clinically relevant recurrences of depression, a reduction in clinically relevant recurrences of mania, a decrease in Young Mania Rating Scale (YMRS) score, an increase in time to worsening of Young Mania Rating Scale (YMRS) score, a decrease in Clinical Global Impressions (CGI) Scale for use in bipolar illness (CGI-BP) score, an increase in time to worsening of Clinical Global Impressions (CGI) Scale for use in bipolar illness (CGI-BP) score, a decrease in Beck depression inventory score, an increase in the number of patients demonstrating actual responses, an increase in the number of patients reaching remission, a decrease in the number of mood episodes, a decrease in the frequency of presentation of mood episodes, a decrease in the intensity of mood episodes, a decrease in the number of DSM-5 diagnostic criteria, a decrease in the frequency of presentation of DSM-5 diagnostic criteria, a decrease in the intensity of DSM-5 diagnostic criteria and/or an increase in the time to relapse. In one embodiment, said increases, decreases and reductions of scores and/or presentations of symptoms can be assessed in comparison to the scores and/or presentations of symptoms as identified before treatment is initiated, i.e. baseline. In another embodiment, said increases, decreases and reductions of scores and/or presentations of symptoms can be assessed in comparison to the scores and/or presentations of symptoms as identified in a different treatment group. In one embodiment, the different treatment group is a second medication other than ketamine or esketamine. In another embodiment, the different treatment group is a placebo.

In one embodiment, the bipolar disorder has not responded to adequate doses and treatment duration of antidepressants other than ketamine or esketamine. In some aspects, the non-responder has failed to demonstrate an improvement of up to 25% in MADRS score, a similar psychometric score or in patient self-reporting of their global impression of improvement, after adequate doses and treatment duration of antidepressants other than ketamine or esketamine. In other aspects, the non-responder has demonstrated an incomplete improvement of between 25-50% in MADRS score, a similar psychometric score or in patient self-reporting of their global impression of improvement, after adequate doses and treatment duration of antidepressants other than ketamine or esketamine. In other aspects, the non-responder has demonstrated an inadequate improvement of up to 50% in MADRS score, a similar psychometric score or in patient self-reporting of their global impression of improvement, after adequate doses and treatment duration of antidepressants other than ketamine or esketamine. In some aspects, the adequate doses and treatment duration of antidepressants other than ketamine or esketamine, refers to doses and treatment duration of one, or more, antidepressants other than ketamine or esketamine during the current major depressive episode. In other aspects, the adequate course refers to the non-response to doses and treatment duration of one, or more, antidepressants other than ketamine or esketamine during a previous major depressive episode. In other aspects, the adequate course refers to the non-response to doses and treatment duration of one, or more, antidepressants other than ketamine or esketamine both during a previous major depressive episode and during the current major depressive episode. In some aspects, the disorder is treatment-refractory or treatment-resistant bipolar depression, i.e., bipolar depression that has failed to respond to adequate doses and treatment duration of at least two antidepressants other than ketamine or esketamine.

In one embodiment, the bipolar disorder has not responded to adequate doses and treatment duration of an antimanic agent. In some aspects, the non-responder has failed to demonstrate an improvement of up to 25% in MADRS score, a similar psychometric score or in patient self-reporting of their global impression of improvement, after adequate doses and treatment duration of an antimanic agent. In other aspects, the non-responder has demonstrated an incomplete improvement of between 25-50% in MADRS score, a similar psychometric score or in patient self-reporting of their global impression of improvement, after adequate doses and treatment duration of an antimanic agent. In other aspects, the non-responder has demonstrated an inadequate improvement of up to 50% in MADRS score, a similar psychometric score or in patient self-reporting of their global impression of improvement, after adequate doses and treatment duration of an antimanic agent. In some aspects, the adequate doses and treatment duration of an antimanic agent, refers to doses and treatment duration of one, or more, antimanic agents during the current major depressive episode. In other aspects, the adequate course refers to the non-response to doses and treatment duration of one, or more, antimanic agents during a previous major depressive episode. In other aspects, the adequate course refers to the non-response to doses and treatment duration of one, or more, antimanic agents both during a previous major depressive episode and during the current major depressive episode.

As used herein, the term "borderline personality disorder" can refer to a neuropsychiatric disorder in which an individual suffers from a pervasive pattern of instability of interpersonal relationships, self-image, affects, and marked impulsivity and which begins by early adulthood.

As used herein, the term "treating borderline personality disorder" can refer to a reduction of the symptoms of borderline personality disorder. In some aspects, treating borderline personality disorder refers to a decrease in Clinical Interview Schedule-Revised (CIS-R) score, an increase in time to worsening of Clinical Interview Schedule-Revised (CIS-R) score, a decrease in the Clinical Interview for Depression score, an increase in time to worsening Clinical Interview for Depression score, of an increase in the number of patients reaching remission, a decrease in the Clinical Interview for Mania score, a decrease in the number of DSM-5 diagnostic criteria, a decrease in the frequency of presentation of DSM-5 diagnostic criteria and/or an increase in time to worsening of Clinical Interview for Mania score.

As used herein, the term "bulimia nervosa" can refer to a neuropsychiatric condition in which an individual suffers from recurrent episodes of binge eating, recurrent inappropriate compensatory behaviors to prevent weight gain and self-evaluation that is unduly influenced by body shape and weight.

As used herein, the term "treating bulimia nervosa" can refer to a reduction of the symptoms of bulimia nervosa. In some aspects, treating bulimia nervosa refers to a an increase from baseline in body weight, an increase from baseline in appetite, an increase in Body Mass Index (BMI), a decrease in the obsessions subscale of the Yale-Brown Obsessive Compulsive scale, an increase in time to worsening of Yale-Brown Obsessive Compulsive scale, a decrease in Eating Disorder Inventory Drive for Thinness subscale, an increase in time to worsening of Eating Disorder Inventory Drive for Thinness subscale, a decrease in Eating Disorder Inventory (EDI) score for Body Dissatisfaction, an increase in time to worsening of Eating Disorder Inventory (EDI) score for Body Dissatisfaction, a decrease in Ease of Eating Scale (EOES) score, an increase in time to worsening of Ease of Eating Scale (EOES) score, a decrease in the time to Reach 90% Ideal Body Weight (IBW) and maintain said weight for one month, an increase in the number of patients reaching remission, a reduction in Eating Disorders Examination Questionnaire (EDE-Q) score, a decrease in the number of DSM-5 diagnostic criteria, a decrease in the frequency of presentation of DSM-5 diagnostic criteria and/or an increase in time to worsening of Eating Disorders Examination Questionnaire (EDE-Q) score.

As used herein, the term "premenstrual dysphoric disorder", PMDD, can refer to a neuropsychiatric condition in which an individual suffers from expressions of mood lability, irritability, dysphoria, and anxiety symptoms that occur repeatedly during the premenstrual phase of the cycle and remit around the onset of menses or shortly thereafter.

As used herein, the term "treating PMDD" can refer to a reduction of the symptoms of PMDD. In some aspects, treating PMDD refers to a decrease in Daily Record of Severity of Problems (DRSP) score, an increase in time to worsening of Daily Record of Severity of Problems (DRSP) score, a decrease in the incidence of treatment emergent adverse events, an increase in the number of patients reaching remission, a decrease in the number of DSM-5 diagnostic criteria, a decrease in the frequency of presentation of DSM-5 diagnostic criteria and/or a decrease in migraine pain scale score for a single menstrual migraine attack.

As used herein, the term "schizoaffective disorder" can refer to a neuropsychiatric condition in which an individual suffers from an uninterrupted period of illness during which the individual continues to display active or residual symptoms of psychotic illness. In one embodiment, schizoaffective disorder includes both bipolar and depressive schizoaffective disorder types.

As used herein, the term "treating schizoaffective disorder" can refer to a reduction of the symptoms of schizoaffective disorder. In some aspects, treating schizoaffective disorder refers to a decrease in Positive and Negative Symptoms of Schizophrenia (PANSS) score, an increase in time to worsening of Positive and Negative Symptoms of Schizophrenia (PANSS) score, a decrease in Scale for the Assessment of Negative Symptoms (SANS) score, an increase in time to worsening of Scale for the Assessment of Negative Symptoms (SANS) score, a decrease in Scale for the Assessment of Positive Symptoms (SAPS) score, an increase in time to worsening of Scale for the Assessment of Positive Symptoms (SAPS) score, a decrease in Clinical Global Impression (CGI-S-SCA) Severity for Schizoaffective Disorder score, an increase in time to worsening of Clinical Global Impression (CGI-S-SCA) Severity for Schizoaffective Disorder score, an increase in Personal and Social Performance (PSP) score, an increase in time to worsening of Personal and Social Performance (PSP) score, a decrease in Hamilton Rating Scale for Depression score in patients suffering from schizoaffective disorder, an increase in time to worsening of Hamilton Rating Scale for Depression score in patients suffering from schizoaffective disorder, a decrease in Young Mania Rating Scale (YMRS) score, an increase in time to worsening of Young Mania Rating Scale (YMRS) score, a decrease in Montgomery-Åsberg Depression Rating Scale (MADRS) score in patients suffering from schizoaffective disorder, an increase in time to worsening of Montgomery-Åsberg Depression Rating Scale (MADRS) score in patients suffering from schizoaffective disorder, a decrease in Hamilton Depression Rating Scale score in patients suffering from schizoaffective disorder, an increase in time to worsening of Hamilton Depression Rating Scale score in patients suffering from schizoaffective disorder, a decrease in clinically relevant recurrences of depression, a reduction in clinically relevant recurrences of mania, a decrease in Beck depression inventory score, an increase in the number of patients demonstrating actual responses, an increase in the number of patients reaching remission, an increase in the number of patients reaching remission, a decrease in the number of DSM-5 diagnostic criteria, a decrease in the frequency of presentation of DSM-5 diagnostic criteria and/or an increase in the time to relapse.

As used herein, the term "schizophrenia" can refer to a neuropsychiatric condition in which an individual suffers from a range of cognitive, behavioral, and emotional dysfunctions including the clear presence of delusions, hallucinations and/or disorganized speech.

As used herein, the term "treating schizophrenia" can refer to a reduction of the symptoms of schizophrenia. In some aspects, treating schizophrenia refers to a decrease in Positive and Negative Symptoms of Schizophrenia (PANSS) score, an increase in time to worsening of Positive and Negative Symptoms of Schizophrenia (PANSS) score, a decrease in Scale for the Assessment of Negative Symptoms (SANS) score, an increase in time to worsening of Scale for the Assessment of Negative Symptoms (SANS) score, a decrease in Scale for the Assessment of Positive Symptoms (SAPS) score, an increase in time to worsening of Scale for the Assessment of Positive Symptoms (SAPS) score, a decrease in Clinical Global Impression (CGI-S) Severity score, an increase in time to worsening of Clinical Global Impression (CGI-S) Severity score, an increase in Personal and Social Performance (PSP) score, an increase in time to worsening of Personal and Social Performance (PSP) score, an increase in the number of patients reaching remission, a decrease in the number of DSM-5 diagnostic criteria, a decrease in the frequency of presentation of DSM-5 diagnostic criteria and/or an increase in the time to relapse.

As used herein, the term "neurological condition" can refer to a disease of the central and/or peripheral nervous system.

As used herein, the term "Amyotrophic Lateral Sclerosis", or ALS, can refer to a neurological condition affecting upper motor neurons in the brain and lower motor neurons in the brain stem and spinal cord. The condition can manifest clinically as progressive weakness, atrophy, fasciculation, hyperreflexia, dysarthria, dysphagia, and eventual paralysis of respiratory function.

As used herein, the term "treating ALS" can refer to a reduction of the symptoms of ALS. In some aspects, treating ALS refers to a decrease in Amyotrophic Lateral Sclerosis Functional Rating Scale-Revised (ALSFRS-R) score, an increase in time to worsening of Amyotrophic Lateral Sclerosis Functional Rating Scale-Revised (ALSFRS-R) score, an increase in Ventilation Assistance-free Survival (VAFS) time, an increase in overall survival time, an increase in muscle strength as measured by Handheld Dynamometry (HHD), a decrease in Amyotrophic Lateral Sclerosis Assessment Questionnaire-40 (ALSAQ-40) score, an increase in time to worsening of Amyotrophic Lateral Sclerosis Assessment Questionnaire-40 (ALSAQ-40) score, a decrease in Amyotrophic Lateral Sclerosis Assessment Questionnaire-5 (ALSAQ-5) score, an increase in time to worsening of Amyotrophic Lateral Sclerosis Assessment Questionnaire-5 (ALSAQ-5) score, an increase in Progression Free Survival (PFS) time, a decrease in Norris ALS scale score, an increase in time to worsening of Norris ALS scale score, a decrease in Appel ALS scale score, an increase in time to worsening of Appel ALS scale score, an increase in Edinburgh Cognitive and Behavioral Amyotrophic Lateral Sclerosis Screen (ECAS) score and/or an increase in time to worsening of Edinburgh Cognitive and Behavioral Amyotrophic Lateral Sclerosis Screen (ECAS) score.

As used herein, the term "Alzheimer's Disease" can refer to a neurological condition affecting the brain characterized by the insidious onset of dementia. The condition can manifest clinically as impairment of memory, judgment, attention span, and problem solving skills, severe apraxias and a global loss of cognitive abilities.

As used herein, the term "treating Alzheimer's Disease" can refer to a reduction of the symptoms of Alzheimer's Disease. In some aspects, treating Alzheimer's Disease refers to a decrease in Clinical Dementia Rating-Sum of Boxes (CDR-SB) score, an increase in time to worsening of Clinical Dementia Rating-Sum of Boxes (CDR-SB) score, a decrease in Alzheimer's Disease Composite Score (AD-COMS), an increase in time to worsening of Alzheimer's Disease Composite Score (ADCOMS), an increase in time to worsening of Clinical Dementia Rating (CDR) score, an increase in time to worsening of Clinical Dementia Rating (CDR) score, an increase in Mini-Mental State Exam (MMSE) score, an increase in time to worsening of Mini-Mental State Exam (MMSE) score, a decrease in Alzheimer's Disease Assessment Scale Cognitive subscale (ADAS-Cog) score, an increase in time to worsening of Alzheimer's Disease Assessment Scale Cognitive subscale (ADAS-Cog) score, an increase in Alzheimer's Disease Cooperative Study—Activities of Daily Living (ADCS-ADL) score and/or an increase in time to worsening of Alzheimer's Disease Cooperative Study—Activities of Daily Living (ADCS-ADL) score.

As used herein, the term "chronic fatigue" can refer to a neurological condition characterized by persistent or recurrent fatigue, diffuse musculoskeletal pain, sleep disturbances, and subjective cognitive impairment wherein said symptoms are not caused by ongoing exertion and are not relieved by rest. In some embodiments, chronic fatigue is a clinical presentation secondary to another pathology wherein said pathology can include cancer, depression, bipolar disorder, Parkinson's disease and fibromyalgia.

As used herein, the term "treating chronic fatigue" can refer to a reduction of the symptoms of chronic fatigue. In some aspects, treating chronic fatigue refers to a decrease in Multidimensional Fatigue Inventory (MFI)—general fatigue subscale score, an increase in time to worsening of Multidimensional Fatigue Inventory (MFI)—general fatigue subscale score, a decrease in Brief Pain Inventory (BPI)—average pain severity score, an increase in time to worsening of Brief Pain Inventory (BPI)—average pain severity score, a decrease in Hospital Anxiety and Depression Scale (HADS)—depression subscale score, an increase in time to worsening of Hospital Anxiety and Depression Scale (HADS)—depression subscale score, a decrease in Checklist Individual Strength (CIS) score, an increase in time to worsening of Checklist Individual Strength (CIS) score and/or an increase in the percentage of patients with 20% or greater improvement in CIS total score.

As used herein, the term "diabetic neuropathy" can refer to a neurological condition affecting peripheral, autonomic, and cranial nerves that are associated with diabetes mellitus.

As used herein, the term "treating diabetic neuropathy" can refer to a reduction of the symptoms of diabetic neuropathy. In some aspects, treating diabetic neuropathy refers to a decrease in Utah Early Neuropathy Scale (UENS) score, an increase in time to worsening of Utah Early Neuropathy Scale (UENS) score, a decrease in Norfolk Quality of Life-Diabetes Neuropathy (NQoL-DN) score, an increase in time to worsening of Norfolk Quality of Life-Diabetes Neuropathy (NQoL-DN) score, a decrease in Neuropathy Impairment Score of the Lower Limb (NIS-LL) score, an increase in time to worsening of Neuropathy Impairment Score of the Lower Limb (NIS-LL) score, a decrease in Michigan Diabetic Neuropathy (MNDS) score, an increase in time to worsening of Michigan Diabetic Neuropathy (MNDS) score, a decrease in modified Toronto Clinical Neuropathy Scale (mTCNS) score and/or an increase in time to worsening of Toronto Clinical Neuropathy Scale (mTCNS) score.

As used herein, the term "dyskinesia" can refer to a neurological condition characterized by abnormal involuntary movements which primarily affect the extremities, trunk, or jaw that typically occur as a manifestation of an underlying disease process. In one embodiment, the dyskinesia is levodopa induced dyskinesia.

As used herein, the term "treating dyskinesias" can refer to a reduction of the symptoms of dyskinesias. In some aspects, treating dyskinesias refers to a decrease in Abnormal Involuntary Movement Scale (AIMS) score, an increase in time to worsening of Abnormal Involuntary Movement Scale (AIMS) score, a decrease in Unified Dyskinesia Rating Scale (UDysRS) score, an increase in time to worsening of Unified Dyskinesia Rating Scale (UDysRS) score, a decrease in Rush Dyskinesia Rating Scale (RDRS) score, an increase in time to worsening of Rush Dyskinesia Rating Scale (RDRS) score increase, a decrease in Lang-Fahn Activities of Daily Living Dyskinesia Rating Scale (LF) score, an increase in time to worsening of Lang-Fahn Activities of Daily Living Dyskinesia Rating Scale (LF).

As used herein, the term "fibromyalgia" can refer to a neurological condition characterized by myalgia and multiple points of focal muscle tenderness to palpation (trigger points) wherein muscle pain can be aggravated by inactivity or exposure to cold. In some embodiments, fibromyalgia can manifest clinically with general symptoms, such as sleep disturbances, fatigue, stiffness, headaches, and occasionally depression.

As used herein, the term "treating fibromyalgia" can refer to a reduction of the symptoms of fibromyalgia. In some aspects, treating fibromyalgia refers to a decrease in Fibromyalgia Impact Questionnaire-Revised (FIQ-R) score, an increase in time to worsening of Fibromyalgia Impact Questionnaire-Revised (FIQ-R) score, an increase in Daily Sleep Interference (DSIS) score, an increase in time to worsening of Daily Sleep Interference (DSIS) score, a decrease in Pain Intensity-Numerical Rating Scale (PI-NRS) score and/or an increase in time to worsening of Pain Intensity-Numerical Rating Scale (PI-NRS) score.

As used herein, the term "opioid tolerance" can refer to a neurological condition characterized by a patient's tolerance to opioid's analgesic and other effects typically leading to a reduction in analgesic efficacy and dose escalations.

As used herein, the term "treating opioid tolerance" can refer to a reduction of the symptoms of opioid tolerance. In some aspects, treating opioid tolerance refers to a decrease in opioid consumption, to an increase in a decrease in average pain intensity, to a decrease in worst pain intensity, to a decrease in rescue medication consumption, a decrease in the frequency of administration of rescue medication, a decrease in Brief Pain Inventory (BPI) average pain score, a decrease in Brief Pain Inventory (BPI) worst pain score, a decrease in Summed Pain Intensity Difference (SPID) score, an increase in Total Pain Relief (TOTPAR) score, a decrease in time to peak pain relief, a decrease in time to first perceptible pain relief, a decrease in time to meaningful pain relief and/or a decrease in Average Daily Pain (ADPS) score.

As used herein, the term "pain" can refer to a neurological condition characterized by an unpleasant sensation induced by noxious stimuli. In one embodiment, the pain is neuropathic pain. In another embodiment, the pain is nociceptive pain. As used herein, the term "neuropathic pain" can refer to pain associated with damage to, or disease affecting, the nervous system and can be either central, peripheral or mixed central and peripheral. As used herein, the term "nociceptive pain" can refer to pain associated with stimulation of sensory nerve fibers and can be either superficial, deep or a mixture of the two. In one embodiment, the pain is acute pain. In another embodiment, the pain is chronic pain.

As used herein, the term "treating pain" can refer to a reduction of the symptoms of pain. In some aspects, treating pain refers to a decrease in average pain intensity, to a decrease in worst pain intensity, to a decrease in opioid consumption, to a decrease in rescue medication consumption, a decrease in the frequency of administration of rescue medication, a decrease in Brief Pain Inventory (BPI) average pain score, an increase in time to worsening of Brief Pain Inventory (BPI) average pain score, a decrease in Brief Pain Inventory (BPI) worst pain score, an increase in time to worsening of Brief Pain Inventory (BPI) worst pain score, a decrease in Summed Pain Intensity Difference (SPID) score, an increase in time to worsening of Summed Pain Intensity Difference (SPID) score, an increase in Total Pain Relief (TOTPAR) score, an increase in time to worsening of Total Pain Relief (TOTPAR) score, a decrease in time to peak pain relief, a decrease in time to first perceptible pain relief, a decrease in time to meaningful pain relief, a decrease in Average Daily Pain (ADPS) score and/or an increase in time to worsening of Average Daily Pain (ADPS) score.

As used herein, the term "traumatic brain injury" can refer to a neurological condition characterized as an acquired brain injury which occurs when a sudden trauma causes damage to the brain.

As used herein, the term "treating traumatic brain injury" can refer to a reduction of the symptoms of traumatic brain injury. In some aspects, treating traumatic brain injury refers to an increase in Glasgow Outcome Scale (GOS) score, an increase in time to worsening of Glasgow Outcome Scale (GOS) score, an increase in Glasgow Coma Scale (GCS) score, an increase in time to worsening of Glasgow Coma Scale (GCS) score, an increase in Quality of Life after Brain Injury (QOLIBRI) score, an increase in time to worsening of Quality of Life after Brain Injury (QOLIBRI) score, a decrease in Neuropsychiatric Inventory Clinician Rating Scale (NPI-C) sub-scale scores for clinical impression severity, aggression, agitation, irritability/lability and/or disinhibition, an increase in time to worsening of Neuropsychiatric Inventory Clinician Rating Scale (NPI-C) sub-scale scores for clinical impression severity, aggression, agitation, irritability/lability and/or disinhibition, a decrease in Patient Global Impression of Severity (PGI-S) score, an increase in time to worsening of Patient Global Impression of Severity (PGI-S) score, an increase in Fugl-Meyer Motor Scale (FMMS) score, an increase in time to worsening of Fugl-Meyer Motor Scale (FMMS) score, a decrease in Disability Rating Scale (DRS) score and/or an increase in time to worsening of Disability Rating Scale (DRS) score.

In one embodiment, said increases, decreases and reductions of scores and/or presentations of symptoms of a condition other than major depressive disorder can be assessed in comparison to the scores and/or presentations of symptoms as identified before treatment is initiated, i.e. baseline. In another embodiment, said increases, decreases and reductions of scores and/or presentations of symptoms condition other than major depressive disorder can be assessed in comparison to the scores and/or presentations of symptoms as identified in a different treatment group. In one embodiment, the different treatment group is a second medication other than ketamine or esketamine. In another embodiment, the different treatment group is a placebo.

The methods of the disclosure will exhibit an acceptable safety and/or tolerability profile. That is, the benefits achieved using the methods of the disclosure will outweigh any safety and/or tolerability considerations exhibited by using the disclosed methods, as compared to placebo. In other aspects, the benefits achieved using the methods of the disclosure will outweigh any safety and/or tolerability considerations exhibited by using the disclosed methods, as compared to other methods of treating conditions other than major depressive disorder. Other methods of treating a condition other than major depressive disorder, include other methods of using ketamine and esketamine. For example, the benefits achieved using the methods of the disclosure will outweigh any adverse events including, for example, untoward changes in hematology, biochemistry, urinalysis, immunological parameters, physical examination findings, blood pressure, and/or heart rate, as compared to placebo. In other aspects, the benefits achieved using the methods of the disclosure will outweigh any adverse events including, for example, changes in hematology, biochemistry, urinalysis, immunological parameters, physical examination findings, blood pressure, and/or heart rate, as compared to other methods of treating a condition other than major depressive disorder.

In other aspects, the benefits achieved using the methods of the disclosure with outweigh any adverse events in 12 lead ECG findings, method discontinuation, Digit Symbol Substitution Test (DSST), reaction time test (Cambridge COGNITION and/or Cogstate battery), self-administered Stanford sleepiness scale, a Bladder Pain/Interstitial Cystitis Symptom Score (BPIC-SS), a Modified Observer's Alertness/Sedation Scale (MOAA/S), a Clinician-Administered Dissociative States Scale (CADSS), a Suicidality Scale-Clinician-Rated Columbia Suicide Severity Rating Scale (C-SSRS), 4 items positive symptoms subscale from the Brief Psychiatric Rating Scale (BPRS), and/or 20 item Physician Withdrawal Checklist (PWC-20), as compared to placebo. In other aspects, the benefits achieved using the methods of the disclosure with outweigh any adverse events in 12 lead ECG findings, method discontinuation, Digit Symbol Substitution Test (DSST), reaction time test (Cambridge COGNITION and/or Cogstate battery), self-administered Stanford sleepiness scale, a Bladder Pain/Interstitial Cystitis Symptom Score (BPIC-SS), a Modified Observer's Alertness/Sedation Scale (MOAA/S), a Clinician-Administered Dissociative States Scale (CADSS), a Suicidality Scale-Clinician-Rated Columbia Suicide Severity Rating Scale (C-SSRS), 4 items positive symptoms subscale from the Brief Psychiatric Rating Scale (BPRS), and/or 20 item Physician Withdrawal Checklist (PWC-20), as compared to other methods of treating a condition other than MDD.

As used herein, the term "ketamine" shall refer to the chemical compound dl 2-(2-chlorophenyl)-2(methylamino) cyclohexanone, or a pharmaceutically acceptable salt thereof.

As used herein, the term "esketamine" shall refer to the (S)-enantiomer of ketamine also known as the chemical compound (2S)-2-(2-Chlorophenyl)-2-(methylamino) cyclohexanone, or a pharmaceutically acceptable salt thereof. As used herein, the term "esketamine" shall be understood to be to the exclusion of the compound as found, without an enantiomeric excess, in ketamine, or a pharmaceutically acceptable salt thereof. In one embodiment, the esketamine, or a pharmaceutically acceptable salt thereof, is the hydrochloride salt of esketamine, i.e., esketamine hydrochloride.

As used herein, the term "(R)-ketamine" shall refer to the (R)-enantiomer of ketamine also known as the chemical compound (2R)-2-(2-Chlorophenyl)-2-(methylamino) cyclohexanone, or a pharmaceutically acceptable salt thereof. As used herein, the term "(R)-ketamine" shall be understood to be to the exclusion of the compound as found, without an enantiomeric excess, in ketamine, or a pharmaceutically acceptable salt thereof.

As used herein, the term "(S)-norketamine" shall refer to the (S)-enantiomer of norketamine also known as the chemical compound (2S)-2-(2-Chlorophenyl)-2-(amino) cyclohexanone, or a pharmaceutically acceptable salt thereof. As used herein, the term "(S)-norketamine" shall be understood to be to the exclusion of the compound as found, without an enantiomeric excess, in norketamine, or a pharmaceutically acceptable salt thereof.

As used herein, the term "(2S,6S)—OH-norketamine" shall refer to the (2S,6S)-enantiomer of hydroxynorketamine also known as the chemical compound (2S,6S)-2-Amino-2-(2-chlorophenyl)-6-hydroxycyclohexanone, or a pharmaceutically acceptable salt thereof. As used herein, the term "(2S,6S)—OH-Norketamine" shall be understood to be to the exclusion of the compound as found, without an enantiomeric excess, in hydroxynorketamine, or a pharmaceutically acceptable salt thereof.

The chemical compounds described herein according to the invention are also intended to include such compounds wherein the molecular structures include isotopes of carbon, hydrogen and nitrogen atoms occurring on those structures. Isotopes include those atoms having the same atomic number but different mass numbers. For example, isotopes of hydrogen include deuterium. Isotopes of carbon include C-13. Isotopes of nitrogen include N-15.

Accordingly, within the chemical structure of any chemical compound taught in this application as suitable for the formulations disclosed herein:

any hydrogen atom or group of hydrogen atoms, could suitably be replaced by an isotope of hydrogen, i.e., deuterium;

any carbon atom or group of carbon atoms, could suitably be replaced by an isotope of carbon, i.e., $^{13}C$; and any nitrogen atom or group of nitrogen atoms, could suitably be replaced by an isotope of nitrogen, i.e., $^{15}N$.

As used herein, the term "treatment regimen" shall refer to time period during which the human patient, in need thereof, will be treated by more than one, either daily or intermittent, administrations of esketamine. In a preferred embodiment of the invention, the treatment regimen will extend for at least 28 days. In another preferred embodiment, the treatment regimen will extend for at least 30 days. In another preferred embodiment, the treatment regimen will be for 28 days to about 365 days. In another preferred embodiment, the treatment regimen will be for 28 days to about 730 days. Another preferred embodiment, the treatment regimen will extend for at least one month. In another preferred embodiment, the treatment regimen will extend for at least 1 year (365 days). In another preferred embodiment of the invention, the treatment regimen will extend for at least about 730 days, that is, at least about 2 years. In another embodiment, the treatment regimen varies over the course of the 28 to about 730 days (i.e., about two years). A medical professional skilled in the art of psychiatry will be able to determine the administration regimen over the 28 to about 730 days (e.g. about two years).

In one embodiment, the reduction of the symptoms of a condition other than major depressive disorder are on or after day 28 of the treatment regimen. In another embodiment, the reduction of the symptoms of a condition other than major depressive disorder are on or after day 30 of the treatment regimen. In another embodiment, the reduction of the symptoms of a condition other than major depressive disorder are on or after day 365 of the treatment regimen. In another embodiment, the reduction of the symptoms of a condition other than major depressive disorder are on or after day 730 of the treatment regimen. In one embodiment, the treatment regimen results in a reduction of the symptoms of a condition other than major depressive disorder are after at least 7 days of treatment. In another embodiment, the treatment regimen results in a reduction of the symptoms of a condition other than major depressive disorder are after at least 14 days of treatment. In another embodiment, the treatment regimen results in a reduction of the symptoms of a condition other than major depressive disorder are after at least 21 days of treatment. In another embodiment, the treatment regimen results in a reduction of the symptoms of a condition other than major depressive disorder are after at least 28 days of treatment. In another embodiment, the treatment regimen results in a reduction of the symptoms of a condition other than major depressive disorder are after at least 365 days of treatment. In another embodiment, the treatment regimen results in a reduction of the symptoms of a condition other than major depressive disorder are after at least 730 days of treatment.

In one embodiment, the reduction of the symptoms of a condition other than major depressive disorder are on or after day 28 of the treatment regimen and are in comparison to the scores and/or presentations of symptoms as identified before treatment is initiated, i.e. baseline. In another embodiment, the reduction of the symptoms of a condition other than major depressive disorder are on or after day 28 of the treatment regimen and are in comparison to the scores and/or presentations of symptoms as identified in a different treatment group. In one embodiment, the different treatment group is a second medication other than ketamine or esketamine. In another embodiment, the different treatment group is a placebo.

In another embodiment, the reduction of the symptoms of a condition other than major depressive disorder are on or after day 30 of the treatment regimen. In another embodiment, the reduction of the symptoms of a condition other than major depressive disorder are on or after day 365 of the treatment regimen. In another embodiment, the reduction of the symptoms of a condition other than major depressive disorder are on or after day 730 of the treatment regimen. In one embodiment, the treatment regimen results in a reduction of the symptoms of a condition other than major depressive disorder are after at least 7 days of treatment. In another embodiment, the treatment regimen results in a reduction of the symptoms of a condition other than major depressive disorder are after at least 14 days of treatment. In another embodiment, the treatment regimen results in a reduction of the symptoms of a condition other than major depressive disorder are after at least 21 days of treatment. In another embodiment, the treatment regimen results in a reduction of the symptoms of a condition other than major depressive disorder are after at least 28 days of treatment. In another embodiment, the treatment regimen results in a reduction of the symptoms of a condition other than major depressive disorder are after at least 365 days of treatment. In another embodiment, the treatment regimen results in a reduction of the symptoms of a condition other than major depressive disorder are after at least 730 days of treatment.

In one embodiment, the reduction or prevention of the symptoms of bipolar disorder are on or after day 28 of the treatment regimen. In another embodiment, the reduction or prevention of the symptoms of bipolar disorder are on or after day 30 of the treatment regimen. In another embodiment, the reduction or prevention of the symptoms of bipolar disorder are on or after day 365 of the treatment regimen. In another embodiment, the reduction or prevention of the symptoms of bipolar disorder are on or after day 730 of the treatment regimen. In one embodiment, the treatment regimen results in a reduction or prevention of the symptoms of bipolar disorder are after at least 7 days of treatment. In another embodiment, the treatment regimen results in a reduction or prevention of the symptoms of bipolar disorder are after at least 14 days of treatment. In another embodiment, the treatment regimen results in a reduction or prevention of the symptoms of bipolar disorder are after at least 21 days of treatment. In another embodiment, the treatment regimen results in a reduction or prevention of the symptoms of bipolar disorder are after at least 28 days of treatment. In another embodiment, the treatment regimen results in a reduction or prevention of the symptoms of bipolar disorder are after at least 365 days of treatment. In another embodiment, the treatment regimen results in a reduction or prevention of the symptoms of bipolar disorder are after at least 730 days of treatment.

In one embodiment, the reduction or prevention of the symptoms of bipolar disorder are on or after day 28 of the treatment regimen and are in comparison to the scores and/or presentations of symptoms as identified before treatment is initiated, i.e. baseline. In another embodiment, the reduction or prevention of the symptoms of bipolar disorder are on or after day 28 of the treatment regimen and are in comparison to the scores and/or presentations of symptoms as identified in a different treatment group. In one embodiment, the different treatment group is a second medication other than ketamine or esketamine. In another embodiment, the different treatment group is a placebo.

In one embodiment, the subject suffering from bipolar disorder is diagnosed as having a MADRS score of greater than 24 immediately prior to starting the treatment regimen. In one embodiment, the subject suffering from bipolar disorder is diagnosed as having a major depressive episode lasting longer than four weeks immediately prior to starting the treatment regimen. In another embodiment, the subject suffering from bipolar disorder is diagnosed as having a major depressive episode lasting less than twelve months immediately prior to starting the treatment regimen. In another embodiment, the subject suffering from bipolar disorder is diagnosed as having a major depressive episode lasting longer than four weeks and less than twelve months immediately prior to starting the treatment regimen. In one embodiment, the patient is diagnosed as having a major depressive episode lasting longer than four weeks and/or less than twelve months based on their MADRS score, a similar psychometric score or in patient self-reporting of their global impression of improvement as assessed immediately prior to starting the treatment regimen.

In one embodiment, the subject suffering from bipolar disorder is diagnosed as having been rapidly cycling in the previous twelve months. In another embodiment, the subject suffering from bipolar disorder is diagnosed as not having been rapidly cycling in the previous twelve months. As used herein, the term "rapid cycling" or "rapidly cycling" refers to the situation wherein the subject suffering from bipolar is identified as having at least four episodes, whether manic, hypomanic, or major depressive, in the previous twelve months.

It is understood that where a parameter range is provided, all integers within that range, and tenths thereof, are also provided by the invention. For example, "1-30 ng/ml" includes 1.1 ng/ml, 1.2 ng/ml, 1.3 ng/ml, etc. up to 30 ng/ml. In another example, "0.1-2.5 mg/day" includes 0.1 mg/day, 0.2 mg/day, 0.3 mg/day, etc. up to 2.5 mg/day.

The present invention is further directed to a method of treating a condition other than major depressive disorder in a human patient in need thereof by orally administering to said patient of an oral dosage form comprising about 5 mg to about 40 mg, preferably 5 mg to 40 mg, of esketamine over a treatment regimen of at least 28 days.

The present invention is further directed to a method of treating bipolar disorder in a human patient in need thereof by orally administering to said patient of an oral dosage form comprising about 5 mg to about 40 mg, preferably 5 mg to 40 mg, of esketamine over a treatment regimen of at least 28 days.

In some aspects, oral dosage forms of the disclosure include esketamine, i.e., esketamine as a free base. In other aspects, oral dosage forms of the disclosure include pharmaceutically acceptable salts of esketamine. As used herein, amounts of esketamine present in the oral dosage forms of the disclosure refer to amounts of esketamine free base. For example, in those aspects wherein the oral dosage form comprises esketamine free base, "10 mg of esketamine" refers to 10 mg of the esketamine free base in the oral dosage form. In aspects wherein the oral dosage form comprises a pharmaceutically acceptable salt of esketamine, such as esketamine hydrochloride, "10 mg of esketamine" refers to 10 mg esketamine free base, based on 11.53 mg of esketamine hydrochloride in the oral dosage form.

In one preferred embodiment of the invention, the oral administration to said patient is of an oral dosage form comprising about 5 mg of esketamine, preferably 5 mg of esketamine. In another preferred embodiment of the invention, the oral administration to said patient is of an oral dosage form comprising about 10 mg of esketamine, preferably 10 mg of esketamine. In another preferred embodiment, the oral administration to said patient is of an oral dosage form comprising about 20 mg of esketamine, preferably 20 mg of esketamine. In another preferred embodiment, the oral administration to said patient is of an oral dosage form comprising about 30 mg of esketamine, preferably 30 mg of esketamine. In yet another preferred embodiment, the oral administration to said patient is of an oral dosage form comprising about 40 mg of esketamine, preferably 40 mg of esketamine.

Without wanting to be bound to any particular theory, it is believed that a therapeutic effect of repeated oral dosing of esketamine in the treatment of a condition other than major depressive disorder can be achieved by either administering higher doses of the drug at longer intervals or administering lower doses of the drug at shorter intervals. As described herein, the present invention allows for equivalent exposure over time of the drug and its metabolites and lower peak concentrations, reduces the overall risk of genotoxic events and improves the clinical safety profile.

The present invention is further directed to a method of treating a condition other than major depressive disorder in a human patient in need thereof by the oral administration to said patient of an oral dosage form comprising about 5 mg to about 40 mg of esketamine, preferably 5 mg to 40 mg of esketamine, wherein the esketamine $C_{max}$ of said administration is 30 ng/ml or less.

The present invention is further directed to a method of treating bipolar disorder in a human patient in need thereof by the oral administration to said patient of an oral dosage form comprising about 5 mg to about 40 mg of esketamine, preferably 5 mg to 40 mg of esketamine, wherein the esketamine $C_{max}$ of said administration is 30 ng/ml or less.

As used herein, the term "$C_{max}$" shall refer to the mean (average) observed maximum plasma concentration assayed after any single administration. In some embodiments the method disclosed herein further comprises measuring plasma levels in the patient.

In one embodiment of the invention, the esketamine $C_{max}$ of said administration is 30 ng/ml or less, 29 ng/ml or less, 28 ng/ml or less, 27 ng/ml or less, 26 ng/ml or less, 25 ng/ml or less, 24 ng/ml or less, 23 ng/ml or less, 22 ng/ml or less, 21 ng/ml or less, 20 ng/ml or less, 19 ng/ml or less, 18 ng/ml or less, 17 ng/ml or less, 16 ng/ml or less, 15 ng/ml or less, 14 ng/ml or less, 13 ng/ml or less, 12 ng/ml or less, 11 ng/ml or less, 10 ng/ml or less, 9 ng/ml or less, 8 ng/ml or less, 7 ng/ml or less, 6 ng/ml or less, 5 ng/ml or less, 4 ng/ml or less, 3 ng/ml or less, 2 ng/ml or less, or 1 ng/ml or less. In one preferred embodiment of the invention, the esketamine $C_{max}$ of said administration is 30 ng/ml or less. In another preferred embodiment of the invention, the esketamine $C_{max}$ of said administration is 15 ng/ml or less. In one preferred embodiment of the invention, the esketamine $C_{max}$ of said administration is between 15 ng/mL and 30 ng/mL. In one preferred embodiment of the invention, the esketamine $C_{max}$ of said administration is between 10 ng/mL and 15 ng/mL. In one preferred embodiment of the invention, the esketamine $C_{max}$ of said administration is between 5 ng/mL and 15 ng/mL. In one preferred embodiment of the invention, the esketamine $C_{max}$ of said administration is between 11 ng/mL and 13 ng/mL.

The present invention is further directed to a method of treating a condition other than major depressive disorder in a human patient in need thereof by the oral administration to said patient of an oral dosage form comprising about 5 mg to about 40 mg of esketamine, for example, 5 mg to 40 mg of esketamine, wherein the esketamine $AUC_{0-t}$ of said administration is 60 ng*h/ml or less.

The present invention is further directed to a method of treating bipolar disorder in a human patient in need thereof by the oral administration to said patient of an oral dosage form comprising about 5 mg to about 40 mg of esketamine, for example, 5 mg to 40 mg of esketamine, wherein the esketamine $AUC_{0-t}$ of said administration is 60 ng*h/ml or less.

As used herein, the term "AUC" shall refer to the area under the plasma concentration/time curve after any single administration. The term "$AUC_{0-t}$" shall refer to the area under the plasma concentration/time curve from time 0 to the last quantifiable concentration after any single administration and the term "$AUC0_{-inf}$" shall refer to the area under the plasma concentration/time curve from time 0 until the extrapolated concentration at infinity after any single administration. The term "$AUC_{tau}$" shall refer to the area under the plasma concentration/time curve over the steady state dosing interval.

In one embodiment of the invention, the esketamine $AUC_{0-t}$ of said administration is 60 ng*h/ml, 59 ng*h/ml, 58 ng*h/ml, 57 ng*h/ml, 56 ng*h/ml, 55 ng*h/ml, 54 ng*h/ml, 53 ng*h/ml, 52 ng*h/ml, 51 ng*h/ml, 50 ng*h/ml, 49 ng*h/ml, 48 ng*h/ml, 47 ng*h/ml, 46 ng*h/ml, 45 ng*h/ml, 44 ng*h/ml, 43 ng*h/ml, 42 ng*h/ml, 41 ng*h/ml, 40 ng*h/ml, 39 ng*h/ml, 38 ng*h/ml, 37 ng*h/ml, 36 ng*h/ml, 35 ng*h/ml, 34 ng*h/ml, 33 ng*h/ml, 32 ng*h/ml, 31 ng*h/ml, 30 ng*h/ml, 29 ng*h/ml, 28 ng*h/ml, 27 ng*h/ml, 26 ng*h/ml, 25 ng*h/ml, 24 ng*h/ml, 23 ng*h/ml, 22 ng*h/ml, 21 ng*h/ml, 20 ng*h/ml, 19 ng*h/ml, 18 ng*h/ml, 17 ng*h/ml, 16 ng*h/ml, 15 ng*h/ml, 14 ng*h/ml, 13 ng*h/ml, 12 ng*h/ml, 11 ng*h/ml, 10 ng*h/ml, 9 ng*h/ml, 8 ng*h/ml, 7 ng*h/ml, 6 ng*h/ml, 5 ng*h/ml, 4 ng*h/ml, 3 ng*h/ml, 2 ng*h/ml, or 1 ng*h/ml. In one preferred embodiment of the invention, the esketamine $AUC_{0-t}$ of said administration is 60 ng*h/ml or less. In another preferred embodiment of the invention, the esketamine $AUC_{0-t}$ of said administration is 30 ng*h/ml or less. In one preferred embodiment of the invention, the esketamine $AUC_{0-t}$ of said administration is between 30 ng*h/ml and 60 ng*h/ml. In one preferred embodiment of the invention, the esketamine $AUC_{0-t}$ of said administration is between 15 ng*h/ml and 30 ng*h/ml.

The present invention is further directed to a method of treating a condition other than major depressive disorder in a human patient in need thereof by the oral administration to said patient of a dosage form, wherein said dosage form provides for an (S)-norketamine $C_{max}$ of 150 ng/ml or less.

The present invention is further directed to a method of treating bipolar disorder in a human patient in need thereof by the oral administration to said patient of a dosage form, wherein said dosage form provides for an (S)-norketamine $C_{max}$ of 150 ng/ml or less.

In one embodiment of the invention, the (S)-norketamine $C_{max}$ of said administration is 150 ng/ml or less, 145 ng/ml or less, 140 ng/ml or less, 139 ng/ml or less, 138 ng/ml or less, 137 ng/ml or less, 136 ng/ml or less, 135 ng/ml or less, 134 ng/ml or less, 133 ng/ml or less, 132 ng/ml or less, 131 ng/ml or less, 130 ng/ml or less, 129 ng/ml or less, 128 ng/ml or less, 127 ng/ml or less, 126 ng/ml or less, 125 ng/ml or less, 120 ng/ml or less, 115 ng/ml or less, 110 ng/ml or less, 105 ng/ml or less, 100 ng/ml or less, 95 ng/ml or less, 90 ng/ml or less, 85 ng/ml or less, 80 ng/ml or less, 75 ng/ml or less, 74 ng/ml or less, 73 ng/ml or less, 72 ng/ml or less, 71 ng/ml or less, 70 ng/ml or less, 69 ng/ml or less, 68 ng/ml or less, 67 ng/ml or less, 66 ng/ml or less, 65 ng/ml or less, 64 ng/ml or less, 63 ng/ml or less, 62 ng/ml or less, 61 ng/ml or less, 60 ng/ml or less, 55 ng/ml or less, 50 ng/ml or less, 45 ng/ml or less, 40 ng/ml or less, 35 ng/ml or less, 34 ng/ml or less, 33 ng/ml or less, 32 ng/ml or less, 31 ng/ml or less, 30 ng/ml or less, 25 ng/ml or less, 20 ng/ml or less, 19 ng/ml or less, 18 ng/ml or less, 17 ng/ml or less, 16 ng/ml or less or 15 ng/ml or less. In one preferred embodiment of the invention, the (S)-norketamine Cm of said administration is 150 ng/ml or less. In another preferred embodiment of the invention, the (S)-norketamine $C_{max}$ of said administration is 75 ng/ml or less. In another preferred embodiment of the invention, the (S)-norketamine $C_{max}$ of said administration is 35 ng/ml or less. In another preferred embodiment of the invention, the (S)-norketamine $C_{max}$ of said administration is 20 ng/ml or less. In one preferred embodiment of the invention, the (S)-norketamine $C_{max}$ of said administration is between 15 ng/mL and 150 ng/mL. In another preferred embodiment of the invention, the (S)-norketamine $C_{max}$ of said administration is between 15 ng/mL and 20 ng/mL. In another preferred embodiment of the invention, the (S)-norketamine $C_{max}$ of said administration is between 30 ng/mL and 35 ng/mL. In another preferred embodiment of the invention, the (S)-norketamine $C_{max}$ of said administration is between 60 ng/mL and 75 ng/mL. In another preferred embodiment of the invention, the (S)-norketamine $C_{max}$ of said administration is between 125 ng/mL and 140 ng/mL. In another preferred embodiment of the invention, the (S)-norketamine $C_{max}$ of said administration is between 60 ng/mL and 140 ng/mL.

The present invention is further directed to a method of treating a condition other than major depressive disorder in a human patient in need thereof by the oral administration to said patient of a dosage form, wherein said dosage form provides for an (S)-norketamine $AUC_{0-t}$ of 850 ng*h/ml or less.

The present invention is further directed to a method of treating bipolar disorder in a human patient in need thereof by the oral administration to said patient of a dosage form, wherein said dosage form provides for an (S)-norketamine $AUC_{0-t}$ of 850 ng*h/ml or less.

In one embodiment of the invention, the (S)-norketamine $AUC_{0-t}$ of said administration is 850 ng*h/ml or less, 845 ng*h/ml or less, 840 ng*h/ml or less, 839 ng*h/ml or less, 838 ng*h/ml or less, 837 ng*h/ml or less, 836 ng*h/ml or less, 835 ng*h/ml or less, 834 ng*h/ml or less, 832 ng*h/ml or less, 831 ng*h/ml or less, 830 ng*h/ml or less, 829 ng*h/ml or less, 828 ng*h/ml or less, 827 ng*h/ml or less, 826 ng*h/ml or less, 825 ng*h/ml or less, 824 ng*h/ml or less, 823 ng*h/ml or less, 822 ng*h/ml or less, 821 ng*h/ml or less, 820 ng*h/ml or less, 815 ng*h/ml or less, 810 ng*h/ml or less, 805 ng*h/ml or less, 800 ng*h/ml or less, 795 ng*h/ml or less, 790 ng*h/ml or less, 785 ng*h/ml or less, 780 ng*h/ml or less, 775 ng*h/ml or less, 770 ng*h/ml or less, 765 ng*h/ml or less, 760 ng*h/ml or less, 755 ng*h/ml or less, 750 ng*h/ml or less, 745 ng*h/ml or less, 740 ng*h/ml or less, 735 ng*h/ml or less, 730 ng*h/ml or less, 725 ng*h/ml or less, 720 ng*h/ml or less, 710 ng*h/ml or less, 700 ng*h/ml or less, 690 ng*h/ml or less, 680 ng*h/ml or less, 670 ng*h/ml or less, 660 ng*h/ml or less, 650 ng*h/ml or less, 640 ng*h/ml or less, 630 ng*h/ml or less, 620 ng*h/ml or less, 610 ng*h/ml or less, 600 ng*h/ml or less, 590 ng*h/ml or less, 580 ng*h/ml or less, 570 ng*h/ml or less, 560 ng*h/ml or less, 550 ng*h/ml or less, 540 ng*h/ml or less, 530 ng*h/ml or less, 520 ng*h/ml or less, 510 ng*h/ml or less, 500 ng*h/ml or less, 490 ng*h/ml or less, 480 ng*h/ml or less, 470 ng*h/ml or less, 460 ng*h/ml or less, 450 ng*h/ml or less, 440 ng*h/ml or less, 430 ng*h/ml or less, 425 ng*h/ml or less, 420 ng*h/ml or less, 419 ng*h/ml or less, 418 ng*h/ml or less, 417 ng*h/ml or less, 416 ng*h/ml or less, 415 ng*h/ml or less, 414 ng*h/ml or less, 413 ng*h/ml or less, 412 ng*h/ml or less, 411 ng*h/ml or less, 410 ng*h/ml or less, 405 ng*h/ml or less, 400 ng*h/ml or less, 390 ng*h/ml or less, 380 ng*h/ml or less, 380 ng*h/ml or less, 370 ng*h/ml or less, 360 ng*h/ml or less, 350 ng*h/ml or less, 340 ng*h/ml or less, 330 ng*h/ml or less, 320 ng*h/ml or less, 310 ng*h/ml or less, 300 ng*h/ml or less, 290 ng*h/ml or less, 280 ng*h/ml or less, 270 ng*h/ml or less, 260 ng*h/ml or less, 250 ng*h/ml or less, 240 ng*h/ml or less, 230 ng*h/ml or less, 220 ng*h/ml or less, 215 ng*h/ml or less, 210 ng*h/ml or less, 209 ng*h/ml or less, 208 ng*h/ml or less, 207 ng*h/ml or less, 206 ng*h/ml or less, 205 ng*h/ml or less, 200 ng*h/ml or less, 190 ng*h/ml or less, 180 ng*h/ml or less, 170 ng*h/ml or less, 160 ng*h/ml or less, 150 ng*h/ml or less, 140 ng*h/ml or less, 130 ng*h/ml or less, 120 ng*h/ml or less, 110 ng*h/ml or less, 105 ng*h/ml or less, 104 ng*h/ml or less, 103 ng*h/ml or less or 102 ng*h/ml or less. In one preferred embodiment of the invention, the (S)-norketamine $AUC_{0-t}$ of said administration is 850 ng*h/ml or less. In another preferred embodiment of the invention, the (S)-norketamine $AUC_{0-t}$ of said administration is 420 ng*h/ml or less. In another preferred embodiment of the invention, the (S)-norketamine $AUC_{0-t}$ of said administration is 210 ng*h/ml or less. In another preferred embodiment of the invention, the (S)-norketamine $AUC_{0-t}$ of said administration is 105 ng*h/ml or less. In one preferred embodiment of the invention, the (S)-norketamine $AUC_{0-t}$ of said administration is between 105 ng*h/ml and 850 ng*h/ml. In another preferred embodiment of the invention, the (S)-norketamine $AUC_{0-t}$ of said administration is between 105 ng*h/ml and 850 ng*h/ml. In another preferred embodiment of the invention, the (S)-norketamine $AUC_{0-t}$ of said administration is between 102 ng*h/ml and 105 ng*h/ml. In another preferred embodiment of the invention, the (S)-norketamine $AUC_{0-t}$ of said administration is between 205 ng*h/ml and 210 ng*h/ml. In another preferred embodiment of the invention, the (S)-norketamine $AUC_{0-t}$ of said administration is between 410 ng*h/ml and 420 ng*h/ml. In another preferred embodiment of the invention, the (S)-norketamine $AUC_{0-t}$ of said administration is between 820 ng*h/ml and 840 ng*h/ml.

The present invention is further directed to a method of treating a condition other than major depressive disorder in a human patient in need thereof by the oral administration to said patient of a dosage form, wherein said dosage form provides for an (2S,6S)—OH-norketamine $C_{max}$ of 75 ng/ml or less.

The present invention is further directed to a method of treating bipolar disorder in a human patient in need thereof by the oral administration to said patient of a dosage form, wherein said dosage form provides for an (2S,6S)—OH-norketamine $C_{max}$ of 75 ng/ml or less.

In one embodiment of the invention, the (2S,6S)—OH-norketamine $C_{max}$ of said administration is 75 ng/ml or less, 74 ng/ml or less, 73 ng/ml or less, 72 ng/ml or less, 71 ng/ml or less, 70 ng/ml or less, 69 ng/ml or less, 68 ng/ml or less, 67 ng/ml or less, 66 ng/ml or less, 65 ng/ml or less, 64 ng/ml or less, 63 ng/ml or less, 62 ng/ml or less, 61 ng/ml or less, 60 ng/ml or less, 55 ng/ml or less, 50 ng/ml or less, 45 ng/ml or less, 40 ng/ml or less, 35 ng/ml or less, 34 ng/ml or less, 33 ng/ml or less, 32 ng/ml or less, 31 ng/ml or less, 30 ng/ml or less, 25 ng/ml or less, 20 ng/ml or less, 19 ng/ml or less, 18 ng/ml or less, 17 ng/ml or less, 16 ng/ml or less or 15 ng/ml or less. In one preferred embodiment of the invention, the (2S,6S)—OH-norketamine $C_{max}$ of said administration is 75 ng/ml or less. In another preferred embodiment of the invention, the (2S,6S)—OH-norketamine $C_{max}$ of said administration is 35 ng/ml or less. In another preferred embodiment of the invention, the (2S,6S)—OH-norketamine $C_{max}$ of said administration is 20 ng/ml or less. In one preferred embodiment of the invention, the (2S,6S)—OH-norketamine $C_{max}$ of said administration is between 15 ng/mL and 75 ng/mL. In another preferred embodiment of the invention, the (2S,6S)—OH-norketamine $C_{max}$ of said administration is between 15 ng/mL and 20 ng/mL. In another preferred embodiment of the invention, the (2S,6S)—OH-norketamine $C_{max}$ of said administration is between 30 ng/mL and 35 ng/mL. In another preferred embodiment of the invention, the (2S,6S)—OH-norketamine $C_{max}$ of said administration is between 60 ng/mL and 75 ng/mL.

The present invention is further directed to a method of treating a condition other than major depressive disorder in a human patient in need thereof by the oral administration to said patient of a dosage form, wherein said dosage form provides for an (2S,6S)—OH-norketamine $AUC_{0-t}$ of 850 ng*h/ml or less.

The present invention is further directed to a method of treating bipolar disorder in a human patient in need thereof by the oral administration to said patient of a dosage form, wherein said dosage form provides for an (2S,6S)—OH-norketamine $AUC_{0-t}$ of 850 ng*h/ml or less.

In one embodiment of the invention, the (2S,6S)—OH-norketamine $AUC_{0-t}$ of said administration is 850 ng*h/ml or less, 845 ng*h/ml or less, 840 ng*h/ml or less, 839 ng*h/ml or less, 838 ng*h/ml or less, 837 ng*h/ml or less, 836 ng*h/ml or less, 835 ng*h/ml or less, 834 ng*h/ml or less, 832 ng*h/ml or less, 831 ng*h/ml or less, 830 ng*h/ml or less, 829 ng*h/ml or less, 828 ng*h/ml or less, 827 ng*h/ml or less, 826 ng*h/ml or less, 825 ng*h/ml or less, 824 ng*h/ml or less, 823 ng*h/ml or less, 822 ng*h/ml or less, 821 ng*h/ml or less, 820 ng*h/ml or less, 815 ng*h/ml or less, 810 ng*h/ml or less, 805 ng*h/ml or less, 800 ng*h/ml or less, 795 ng*h/ml or less, 790 ng*h/ml or less, 785 ng*h/ml or less, 780 ng*h/ml or less, 775 ng*h/ml or less, 770 ng*h/ml or less, 765 ng*h/ml or less, 760 ng*h/ml or less, 755 ng*h/ml or less, 750 ng*h/ml or less, 745 ng*h/ml or less, 740 ng*h/ml or less, 735 ng*h/ml or less, 730 ng*h/ml or less, 725 ng*h/ml or less, 720 ng*h/ml or less, 710 ng*h/ml or less, 700 ng*h/ml or less, 690 ng*h/ml or less, 680 ng*h/ml or less, 670 ng*h/ml or less, 660 ng*h/ml or less, 650 ng*h/ml or less, 640 ng*h/ml or less, 630 ng*h/ml or less, 620 ng*h/ml or less, 610 ng*h/ml or less, 600 ng*h/ml or less, 590 ng*h/ml or less, 580 ng*h/ml or less, 570 ng*h/ml or less, 560 ng*h/ml or less, 550 ng*h/ml or less, 540 ng*h/ml or less, 530 ng*h/ml or less, 520 ng*h/ml or less, 510 ng*h/ml or less, 500 ng*h/ml or less, 490 ng*h/ml or less, 480 ng*h/ml or less, 470 ng*h/ml or less, 460 ng*h/ml or less, 450 ng*h/ml or less, 440 ng*h/ml or less, 430 ng*h/ml or less, 425 ng*h/ml or less, 420 ng*h/ml or less, 419 ng*h/ml or less, 418 ng*h/ml or less, 417 ng*h/ml or less, 416 ng*h/ml or less, 415 ng*h/ml or less, 414 ng*h/ml or less, 413 ng*h/ml or less, 412 ng*h/ml or less, 411 ng*h/ml or less, 410 ng*h/ml or less, 405 ng*h/ml or less, 400 ng*h/ml or less, 390 ng*h/ml or less, 380 ng*h/ml or less, 380 ng*h/ml or less, 370 ng*h/ml or less, 360 ng*h/ml or less, 350 ng*h/ml or less, 340 ng*h/ml or less, 330 ng*h/ml or less, 320 ng*h/ml or less, 310 ng*h/ml or less, 300 ng*h/ml or less, 290 ng*h/ml or less, 280 ng*h/ml or less, 270 ng*h/ml or less, 260 ng*h/ml or less, 250 ng*h/ml or less, 240 ng*h/ml or less, 230 ng*h/ml or less, 220 ng*h/ml or less, 215 ng*h/ml or less, 210 ng*h/ml or less, 209 ng*h/ml or less, 208 ng*h/ml or less, 207 ng*h/ml or less, 206 ng*h/ml or less, 205 ng*h/ml or less, 200 ng*h/ml or less, 190 ng*h/ml or less, 180 ng*h/ml or less, 170 ng*h/ml or less, 160 ng*h/ml or less, 150 ng*h/ml or less, 140 ng*h/ml or less, 130 ng*h/ml or less, 120 ng*h/ml or less, 110 ng*h/ml or less, 105 ng*h/ml or less, 104 ng*h/ml or less, 103 ng*h/ml or less or 102 ng*h/ml or less. In one preferred embodiment of the invention, the (2S,6S)—OH-norketamine $AUC_{0-t}$ of said administration is 850 ng*h/ml or less. In another preferred embodiment of the invention, the (2S,6S)—OH-norketamine $AUC_{0-t}$ of said administration is 420 ng*h/ml or less. In another preferred embodiment of the invention, the (2S,6S)—OH-norketamine $AUC_{0-t}$ of said administration is 210 ng*h/ml or less. In another preferred embodiment of the invention, the (2S,6S)—OH-norketamine $AUC_{0-t}$ of said administration is 105 ng*h/ml or less. In one preferred embodiment of the invention, the (2S,6S)—OH-norketamine $AUC_{0-t}$ of said administration is between 105 ng*h/ml and 850 ng*h/ml. In another preferred embodiment of the invention, the (2S,6S)—OH-norketamine $AUC_{0-t}$ of said administration is between 105 ng*h/ml and 850 ng*h/ml. In another preferred embodiment of the invention, the (2S,6S)—OH-norketamine $AUC_{0-t}$ of said administration is between 102 ng*h/ml and 105 ng*h/ml. In another preferred embodiment of the invention, the (2S,6S)—OH-norketamine $AUC_{0-t}$ of said administration is between 205 ng*h/ml and 210 ng*h/ml. In another preferred embodiment of the invention, the (2S,6S)—OH-norketamine $AUC_{0-t}$ of said administration is between 410 ng*h/ml and 420 ng*h/ml. In another preferred embodiment of the invention, the (2S,6S)—OH-norketamine $AUC_{0-t}$ of said administration is between 820 ng*h/ml and 840 ng*h/ml.

The present invention is further directed to a method of treating a condition other than major depressive disorder, in a human patient in need thereof by the oral administration to said patient of an oral dosage form comprising about 5 mg to about 40 mg, for example of esketamine, 5 mg to 40 mg, of esketamine, wherein the administration is daily.

The present invention is further directed to a method of treating bipolar disorder, in a human patient in need thereof by the oral administration to said patient of an oral dosage form comprising about 5 mg to about 40 mg, for example of esketamine, 5 mg to 40 mg, of esketamine, wherein the administration is daily.

In one embodiment of the invention, the daily administration of esketamine is provided in a single daily dose. In another embodiment of the invention, the daily administration of esketamine is provided in two doses, in three doses, or in four doses, each dose being spread about equally over the 24 hour period.

The present invention is further directed to a method of treating a condition other than major depressive disorder in a human patient in need thereof by the oral administration to said patient of an oral dosage form comprising 5 mg to 40 mg of esketamine, preferably 5 mg to 40 mg of esketamine, wherein the administration is intermittent over the treatment regimen.

The present invention is further directed to a method of treating bipolar disorder in a human patient in need thereof by the oral administration to said patient of an oral dosage form comprising 5 mg to 40 mg of esketamine, preferably 5 mg to 40 mg of esketamine, wherein the administration is intermittent over the treatment regimen.

In a preferred embodiment of the invention, the intermittent administration is once every second day to about once a month or once every 4 weeks. In one embodiment of the invention, the intermittent administration is once every second day, once every third day, twice a week, once every fourth day, once every fifth day, once every sixth day, once a week, once every eighth day, once every ninth day, once every tenth day, once every eleventh day, once every twelfth day, once every thirteenth day, once every two weeks, once every three weeks or once a month. In one preferred embodiment of the invention, the intermittent administration is twice a week. In another preferred embodiment of the invention, the intermittent administration is once a week. In yet another preferred embodiment of the invention, the intermittent administration is once a month. In yet another preferred embodiment of the invention, the intermittent administration is once every 4 weeks.

In one embodiment of the invention, frequency of the intermittent administration can vary over the time period of the treatment regimen. In a preferred embodiment of the invention, the frequency of the intermittent administration is gradually reduced over the time period of the treatment regimen. In a more preferred embodiment of the invention, the frequency of the intermittent administration is reduced from twice a week to once a week. In another preferred embodiment of the invention, the frequency of the intermittent administration is reduced from once a week to once every two weeks. In an even more preferred embodiment of the invention, the frequency of the intermittent administration is reduced from twice a week to once a week to once every two weeks. In another preferred embodiment of the invention, the frequency of the intermittent administration is maintained consistently over the time period of the treatment regimen.

The present invention is further directed to a method of treating a condition other than major depressive disorder in a human patient in need thereof by the oral administration to said patient of an oral dosage form comprising about 5 mg to about 40 mg of esketamine, preferably 5 mg to 40 mg of esketamine, over a treatment regimen of at least 28 days wherein the administration is self-administered.

The present invention is further directed to a method of treating bipolar disorder in a human patient in need thereof by the oral administration to said patient of an oral dosage form comprising about 5 mg to about 40 mg of esketamine, preferably 5 mg to 40 mg of esketamine, over a treatment regimen of at least 28 days wherein the administration is self-administered.

As used herein "self-administered" refers to administration wherein the patient is responsible for taking the medication and is not assisted during the oral administration of the oral dosage form by a healthcare professional. In some aspects, one or more of the administrations may be assisted by a healthcare professional and one or more of the administration may be self-administered over the treatment regimen. In one embodiment, said self-administration is in the patient's own home. In a preferred embodiment, said self-administration is at night. In a more preferred embodiment, said self-administration is before the patient goes to sleep.

In another embodiment, the patient has no restrictions on driving in the 24 hours immediately following the oral administration of the oral dosage form comprising about 5 mg to about 40 mg of esketamine, preferably 5 mg to 40 mg of esketamine. That is, the oral administration of the oral dosage form does not result in a mental or motor impairment that negatively affects the patient's ability to operative a motor vehicle. In the 24 hours immediately following the administration.

In yet another embodiment, the patient is restricted from driving for no more than 10 hours after the oral administration of the oral dosage form comprising about 5 mg to about 40 mg of esketamine, preferably 5 mg to 40 mg of esketamine. In a preferred embodiment, the patient is restricted from driving for no more than 8 hours after the administration. In another preferred embodiment, the patient is restricted from driving for no more than 6 hours after the administration. In a more preferred embodiment, the patient is restricted from driving for no more than 2 hours after the administration. In a most preferred embodiment, the patient is restricted from driving for no more than an hour after the oral administration of the oral dosage form comprising about 5 mg to about 40 mg of esketamine, preferably 5 mg to 40 mg of esketamine.

In one embodiment of the invention, the oral dosage form is a liquid preparation such as a suspension, elixir, or solution. In another embodiment of the invention, the oral dosage forms are solid preparations, for example, powders, capsules, caplets, gelcaps, and tablets. In a preferred embodiment, the oral dosage form is a tablet, gelcap, or capsule. In a more preferred embodiment, the oral dosage form is a tablet.

To prepare the preparations, i.e., the oral dosage forms, of this invention, esketamine, and optionally, at least one second medication other than (R)-ketamine, are admixed with pharmaceutical carriers according to conventional pharmaceutical compounding techniques, which carriers may take a wide variety of forms depending of the form of preparation desired for administration. In preparing the oral preparations, any of the usual pharmaceutical media may be employed. Thus, for liquid oral preparations, such as for example, suspensions, elixirs and solutions, suitable carriers and additives include water, glycols, oils, alcohols, flavoring agents, preservatives, coloring agents and the like. For solid oral preparations such as, for example, powders, capsules, caplets, gelcaps and tablets, suitable carriers and additives include starches, sugars, diluents, granulating agents, lubricants, binders, disintegrating agents and the like. Because of their ease in administration, tablets and capsules represent the most advantageous oral dosage unit form, in which case solid pharmaceutical carriers are employed.

The present invention is further directed to a method of treating a condition other than major depressive disorder in a human patient in need thereof by the administration to said patient of an oral dosage form comprising about 5 mg to about 40 mg of esketamine, preferably 5 mg to 40 mg of esketamine, wherein the oral dosage form is an abuse deterrent formulation.

The present invention is further directed to a method of treating bipolar disorder in a human patient in need thereof by the administration to said patient of an oral dosage form comprising about 5 mg to about 40 mg of esketamine, preferably 5 mg to 40 mg of esketamine, wherein the oral dosage form is an abuse deterrent formulation.

In a more preferred embodiment, the abuse deterrent formulation is a tablet. Abuse deterrent tablet formulations can be prepared by methods known in the art including as found in U.S. Pat. No. 7,955,619, WO2014006004, WO2008033523, WO2008023261, WO2016094358, WO2020225773 and US2004052731 each of which is hereby incorporated by reference.

The present invention is further directed to methods of treating a condition other than major depressive disorder in a human patient in need thereof by the oral administration to said patient of an oral dosage form comprising about 5 mg to about 40 mg of esketamine, preferably 5 mg to 40 mg of esketamine, further comprising the administration of a second medication other than (R)-ketamine.

The present invention is further directed to methods of treating bipolar disorder in a human patient in need thereof by the oral administration to said patient of an oral dosage form comprising about 5 mg to about 40 mg of esketamine, preferably 5 mg to 40 mg of esketamine, further comprising the administration of a second medication other than (R)-ketamine.

In a preferred embodiment, the second medication is an antidepressant or an antimanic agent or an anxiolytic drug. In one embodiment of the invention, the antidepressant is selected from the group consisting of mono-amine oxidase inhibitors (MAOI), tricyclic antidepressants (TCA), serotonin specific reuptake inhibitors (SSRI), serotonin noradrenergic reuptake inhibitors (SNRI), noradrenaline reuptake inhibitor (NRI), "natural products" (such as Kava-Kava, St. John's Wort), dietary supplement (such as s-adenosylmethionine) and others. More specifically, antidepressants include, but are not limited to, imipramine, amitriptyline, desipramine, nortriptyline, doxepin, protriptyline, trimipramine, maprotiline, amoxapine, trazodone, bupropion, chlomipramine, fluoxetine, citalopram, escitalopram, sertraline, paroxetine, tianeptine, agomelatine, nefazadone, venlafaxine, desvenlafaxine, vilazodone, vortioxetine, duloxetine, reboxetine, mirtazapine, mianserin, phenelzine, tranylcypromine, and/or moclobemide.

In another preferred embodiment, the second medication is an antimanic agent. In one embodiment of the invention, the antimanic agent is an anticonvulsant such as carbamazepine, gabapentin, valproic acid, lamotrigine or topiramate. In another embodiment of the invention, the antimanic agent is an antipsychotic medication such as lurasidone, cariprazine, olanzapine, risperidone, quetiapine, paliperidone, lumateperone, aripiprazole or brexpiprazole. In another embodiment of the invention, the antimanic agent is a mood stabilizer such as lithium or a pharmaceutically acceptable salt thereof or a calcium channel blocker. In another embodiment of the invention, the antimanic agent is an anxiolytic drug such as alprazolam, bromazepam, chlordiazepoxide, clonazepam, clorazepate, diazepam, flurazepam, lorazepam, oxazepam, temazepam, triazolam, buspirone, gepirone, ispapirone, hydroxyzine, amobarbital, pentobarbital, phenobarbital, thiopental and propranolol.

The present invention is further directed to a method of treating a condition other than major depressive disorder in a human patient in need thereof, by the oral administration to said patient of an oral dosage form comprising about 5 mg to about 40 mg of esketamine, preferably 5 mg to 40 mg of esketamine and an antidepressant selected from the group consisting of fluoxetine, sertraline, paroxetine, citalopram, escitalopram, venlafaxine, desvenlafaxine, duloxetine, and fluvoxamine and wherein the administration is daily over a treatment regimen of at least 28 days.

The present invention is further directed to a method of treating bipolar disorder in a human patient in need thereof, by the oral administration to said patient of an oral dosage form comprising about 5 mg to about 40 mg of esketamine, preferably 5 mg to 40 mg of esketamine and an antidepressant selected from the group consisting of fluoxetine, sertraline, paroxetine, citalopram, escitalopram, venlafaxine, desvenlafaxine, duloxetine, and fluvoxamine and wherein the administration is daily over a treatment regimen of at least 28 days.

This invention will be better understood by reference to the Examples, which follow, but those skilled in the art will readily appreciate that the specific experiments detailed are only illustrative of the invention as described more fully in the claims which follow thereafter.

EXAMPLES

Example 1: In Vitro Chromosomal Aberration Assay

Example 1a: Esketamine

The clastogenic potential of esketamine was evaluated in the in vitro mammalian chromosome aberration test using human peripheral blood lymphocytes (HPBL) in both the absence and presence of an induced metabolic activation system (the 9000 g supernatant [S9] microsomal fraction of liver homogenate from rats exposed to Aroclor-1254). Clastogenicity was evaluated by microscopic examination of HPBL in metaphase to determine the mitotic index (MI) and percentage of metaphase cells with numerical and/or structural chromosome aberrations.

The study was conducted in 2 phases, with a preliminary toxicity test used to determine the appropriate concentrations for the definitive chromosomal aberration assay. Water was used as a negative (vehicle) control. Toxicity (defined as ≥45% reduction in MI relative to the vehicle control) was evaluated at 9 concentrations, ranging from 0.0238 to 238 µg/ml, after exposure of HPBL to esketamine for 20 hours in the absence of S9 activation, or for 4 hours, either in the presence or absence of S9 activation, followed by a 16-hour recovery period. Toxicity was not observed at any dose in any of the three treatment conditions. Based upon these results, the doses chosen for the chromosomal aberration assay ranged from 30 to 238 µg/ml for all three treatment conditions. All concentrations were between 98% to 101% of the nominal concentrations.

The definitive chromosome aberration assay evaluated HPBL cells after exposure to esketamine for 20 hours in the absence of S9 activation, or for 4 hours, either in the presence of absence of S9 activation, followed by a 16-hour recovery. Positive controls for chromosomal aberrations in non-activated and S9-activated evaluations, respectively, consisted of mitomycin C (MMC, 0.6 and 0.3 µg/mL for the 4- and 20-hour exposures, respectively) and cyclophosphamide (CP, 2.5, 5, and 7.5 µg/mL). Water was associated with mean MI values from 13.4% to 16.5% and numerical or structural chromosomal aberrations in 0% to 0.7% of the cells. In non-activated systems, MMC was associated with a mean MI value of 9% with structural chromosomal aberrations in 13.3% of the cells. In the S9-activated system, CP was associated with a mean MI value of 6.2% and with structural aberrations in 10.7% of the cells. The results for negative controls were within the range of historical controls and the results for positive controls were statistically significant ($p \leq 0.01$, Fisher's exact test). Thus the requirements for a valid test were fulfilled. In the chromosomal aberration assay, cytotoxicity (≥45% reduction in mitotic index relative to the vehicle control) was not observed at any esketamine dose in the non-activated 4- and 20-hour treatment conditions. Cytotoxicity was observed at doses ≥200 µg/mL in the S9-activated 4-hour exposure group. Initially, the doses selected for evaluation of chromosomal aberrations were 60, 120, and 238 µg/mL for the non-activated 4- and 20-hour treatment conditions; and 30, 60, and 200 µg/mL for the S9-activated 4-hour treatment condition.

In the non-activated 4 and 20-hour exposure groups, no significant or dose-dependent increases in structural or numerical (polyploid or endoreduplicated cells) aberrations were observed at any dose (p>0.05; Fisher's Exact and Cochran-Armitage tests).

In the S9-activated 4-hour exposure group, a statistically significant increase (5.0%) in structural aberrations was observed at 200 µg/mL (p≤0.01; Fisher's Exact test). In order to confirm that the statistical significance observed at the high dose was not due to cytotoxicity, a lower dose (120 µg/mL) was included in the evaluation. A statistically significant increase (4.3%) in structural aberrations was observed at 120 µg/mL (p≤0.01; Fisher's Exact test). The Cochran-Armitage test was positive for a dose response (p≤0.01). No significant or dose-dependent increases in numerical (polyploid or endoreduplicated cells) aberrations were observed at any dose (p>0.05; Fisher's Exact and Cochran-Armitage tests).

The results of the study indicate that esketamine was positive for the induction of structural chromosomal aberrations and negative for the induction of numerical chromosomal aberrations in the presence of the exogenous metabolic activation system. Esketamine was negative for the induction of structural and numerical chromosomal aberrations in the absence of the exogenous metabolic activation system.

Example 1b: (S)-Norketamine

The clastogenic potential of (S)-norketamine was evaluated in the in vitro mammalian chromosome aberration test using human peripheral blood lymphocytes (HPBL) in both the absence and presence of an induced metabolic activation system (the 9000 g supernatant [S9] microsomal fraction of liver homogenate from rats exposed to phenobarbital/5,6-benzoflavone). Clastogenicity was evaluated by microscopic examination of HPBL in metaphase to determine the percentage of metaphase cells with numerical and/or structural chromosome aberrations.

The study was conducted in 2 phases, with a preliminary toxicity test used to determine the appropriate concentrations for the definitive chromosomal aberration assay. Water was used as a negative (vehicle) control. In both phases, the cells were treated for 3 and 21 hours in the absence of S9 mix and for 3 hours in the presence of S9 mix. The mitotic index was assessed for all cultures to determine cytotoxicity. Ten concentrations, ranging from 2.62 to 260.16 µg/mL, were evaluated in the preliminary toxicity test. Toxicity was not observed at any dose in any of the three treatment conditions. Based on these results, the highest concentration for the definitive chromosomal aberration assay was based on the limit concentration (260.16 µg/mL, 1 mM) for this test system, where relatively no cytotoxicity was observed. (S)-Norketamine concentrations of 93.66, 156.10 or 260.16 µg/mL were selected for metaphase analysis.

(S)-Norketamine caused no statistically significant increases in the proportion of metaphase figures containing chromosomal aberrations, at any analyzed concentration, when compared with the vehicle control. All mean values for the vehicle control (water), and all (S)-norketamine treatment concentrations were below to the laboratory historical control range, when taken at the upper 95% control limit.

No statistically significant increases in the proportion of polyploid or endoreduplicated metaphase cells were observed during metaphase analysis, under any treatment condition, when compared with the vehicle control whereas both positive control compounds, mytomycin C and cyclophosphamide, caused statistically significant increases in the proportion of aberrant cells, demonstrating the sensitivity of the test system and the efficacy of the S9 mix.

In conclusion, the results of the in vitro mammalian chromosome aberration test using human peripheral blood lymphocytes indicate that (S)-norketamine has shown no evidence of causing an increase in the frequency of structural chromosome aberrations with or without S9. Therefore, under the conditions of this experiment, (S)-norketamine was non-clastogenic, or negative for the induction of structural and numerical chromosomal aberrations.

Example 2: In Vivo Single Cell Gel Electrophoresis Assay and Mammalian Erythrocyte Micronucleus Test of Esketamine in Sprague Dawley Rats The potential of esketamine to induce DNA strand breaks in the liver and also assess the potential induction of micronuclei in the bone marrow cells of Crl:CD(SD) rats. Animals were treated with esketamine orally on three occasions, the second dose being administered approximately 24 hours after the first dose, with the third dose being administered approximately 21 hours after the second dose, 3 hours before sampling. All animals were dosed orally by gavage using a dose volume of 10 mL/kg.

Substantial differences in toxicity were observed between the sexes in the preliminary toxicity test, therefore, in line with current guidelines the test was performed using both male and female animals. Dose levels of 18.75, 37.5 and 75 mg/kg/day (male animals) and 12.5, 25 and 50 mg/kg/day (female animals) were selected. The vehicle control group received purified water and the positive control group for the comet phase received Ethyl Methanesulfonate at 200 mg/kg. Blood samples were taken via the tail vein on Day 3 prior to dosing, at 30 minutes and 3 hours post dose from satellite animals and all main study animals prior to termination.

Cell suspensions from each tissue were obtained from animals in the vehicle control group and in each of the test item groups approximately 3 hours after administration of the third dose. Cell suspensions from animals in the positive control group were obtained approximately 3 hours after a single dose.

Following electrophoresis three slides per animal per tissue were analyzed for comets. Slides were visualized by staining with SYBR GOLD® via fluorescence microscopy. 150 morphologically normal cells were analyzed for the presence of comets per animal per tissue. DNA strand breaks were assessed by comparing the mean and median % tail intensities (% TI) from esketamine treated animals compared to vehicle control values. The slides were also examined for any overt toxicity, e.g. an increase in background debris and/or an increase in the incidence of excessively damaged cells (i.e. Hedgehog cells). These cells were excluded from the analysis, along with any cells that had unusual staining artefacts.

Bone marrow smears were obtained from animals in the vehicle control and in each of the test item groups approximately 3 hours after administration of the third dose. In addition, slides prepared from a separate study [CT12GD] from animals treated with Cyclophosphamide a well characterized clastogen, were stained and coded along with the bone marrow smears prepared from animals in this study.

One smear from each animal was examined for the presence of micronuclei in 4000 polychromatic erythrocytes. The proportion of polychromatic erythrocytes was assessed by examination of at least 1000 erythrocytes from each animal. A record of the incidence of micronucleated normochromatic erythrocytes was also kept.

Statistically significant increases in the median % (TI) were observed in the liver of male Crl:CD(SD) rats administered esketamine at 75 mg/kg/day (p<0.001) compared to vehicle control values. The group mean and median % TI values for male animals administered esketamine at 75 mg/kg/day were outside of the current vehicle historical control range. Statistically significant increases in the median % TI were observed in the liver of female Crl:CD (SD) rats administered esketamine at 25 and 50 mg/kg/day (p<0.001) compared to vehicle control values. The group mean and median % TI values for female animals administered esketamine at 25 and 50 mg/kg/day were outside of the current vehicle historical control range.

The positive control compound, Ethyl methanesulphonate, produced significant increases in the median % TI when compared to vehicle control values in male and female animals (p<0.001, t-test). No Hedgehog cells were observed in the liver of male or female Crl:CD(SD) rats administered esketamine at any dose level, compared to vehicle control values.

Sections of the liver from the vehicle control animals and animals administered esketamine at 75 mg/kg/day (male animals) and 25 and 50 mg/kg/day (female animals) were processed for histopathological examination and assessed for signs of cytotoxicity, necrosis and apoptosis. Increased hepatocellular mitotic figures were observed some males animals given 75 mg/kg/day. The macroscopic examination performed after 3 doses of treatment revealed no test item related lesions.

No statistically significant increases in the frequency of micronucleated polychromatic erythrocytes were observed in male Crl:CD(SD) rats administered esketamine at any dose level compared to vehicle control values. All individual and group mean values were within the current vehicle historical control range (control limits).

Statistically significant decreases in the proportion of polychromatic erythrocytes were observed in male Crl:CD (SD) rats administered esketamine at 37.5 mg/kg/day (pairwise and trend test, p<0.05) and 75 mg/kg/day (trend test, p<0.05), compared to vehicle control values. All individual and group mean values were within the current vehicle historical control range (control limits); therefore this result is not considered to be biologically relevant.

No statistically significant increases in the frequency of micronucleated polychromatic erythrocytes and no statistically significant decreases in the proportion of polychromatic erythrocytes were observed in female Crl:CD(SD) rats administered esketamine at any dose level, compared to vehicle control values. All individual and group mean values were within the current vehicle historical control range (control limits). In accordance with ICH S2(R1) the coded positive control slides prepared from the study CT12GD demonstrated the ability of the scorer to detect increases in micronucleated polychromatic erythrocytes.

The results of the study indicate that esketamine has shown evidence of causing an increase in DNA strand breaks in the liver of male and female Crl:CD(SD) rats when administered orally by gavage but has not shown any evidence of causing an increase in the induction of micronucleated polychromatic erythrocytes or bone marrow cell toxicity in male or female Crl:CD(SD) rats when administered orally by gavage.

Using PROAST v63.3 (in development), the benchmark dose (BMMD50) was modelled based on the mean and median tail intensity values respectively, for the male and female rats following exposure to esketamine. The Hill and exponential models provided a suitable fit to the in vivo comet tail intensity data, which is consistent with the non-linear dose response. The lower benchmark dose (BMDL50) metrics were calculated to be 9.83 mg/kg/day in female rats and 27.31 mg/kg/day in male rats, both using the 'single slide median Tail Intensity' which were lower and more conservative than those derived when using the 'single slide mean Tail Intensity'. These point of departure (POD) metrics are comparable to the no observed genotoxic effect level for comet tail intensity in liver at 12.5 mg/kg/day for female and 37.50 mg/kg/day for male rats.

Example 3: Repeated Dose 28 Day Toxicokinetic Study of Esketamine in Sprague Dawley Rats The objective of the study was to assess the potential toxicity, neurobehavioral effects, and toxicokinetics (TK) of esketamine when administered orally, via gavage, to Sprague Dawley rats for 28 days and to evaluate recovery during a 14-day drug-free period. Fifty male and 50 female rats were randomized into 4 groups (15/sex/Groups 1 and 4; 10/sex/Groups 2 and 3). Esketamine was administered via oral gavage once daily for 28 consecutive days to males at 0 (vehicle control), 6, 10 or 30 mg/kg/day and females at 0 (vehicle control), 2, 10 or 20 mg/kg/day in a dose volume of 10 mL/kg. Animals were observed until euthanized and necropsied on Day 29 (10/sex/group) or 43 (5/sex from Groups 1 and 4). Toxicity was evaluated based on mortality, clinical observations, body weights, food consumption, ophthalmology, motor activity, functional observational battery, clinical pathology (clinical chemistry, hematology, coagulation and urinalysis), organ weights, anatomic (macroscopic or microscopic) pathology. Toxicokinetic animals (3/sex/ Group 1; 6/sex/Groups 2, 3, and 4) were similarly dosed and bled on Day 1 and during Week 4 for toxicokinetic analysis.

There was no mortality found in this study and there were no esketamine-related effects on clinical signs, body weights, food consumption, ophthalmology, motor activity, functional observational battery, clinical pathology or anatomic pathology changes.

Esketamine exposure increased in a generally dose-proportional manner in males and in a slightly greater than dose-proportional manner in females over the dose ranges of 6 to 30 mg/kg/day for males and 2 to 20 mg/kg/day for females. After normalization for dose level differences, males had lower exposures than females. Exposures were similar on Day 28 compared to Day 1, with the exception of $C_{max}$ in females, which was higher on Day 28. The results of the esketamine exposure at day 1 are described in Table 1, and at day 28 in Table 2.

TABLE 1

| Sex | Esketamine dose (mg/kg) | $t_{max}$ (h) | $C_{max}$ (ng/ml) | $AUC_{0-t}$ (ng * h/ml) | $AUC_{0-inf}$ (ng * h/ml) | Dose normalized $AUC_{0-inf}$ (ng * h/ml)/ (mg/kg) | $t_{1/2}$ (h) |
|---|---|---|---|---|---|---|---|
| F | 2  | 0.17 | 67.2  | 57  | 58  | 29.0 | 0.5 |
| F | 10 | 0.17 | 294.9 | 418 | 440 | 44.0 | 0.7 |
| F | 20 | 0.17 | 671.8 | 993 | 995 | 49.8 | 0.9 |
| M | 6  | 0.17 | 108.7 | 99  | 103 | 17.2 | 0.8 |
| M | 10 | 0.17 | 179.2 | 175 | 181 | 18.1 | 0.7 |
| M | 30 | 0.17 | 296.0 | 580 | 585 | 19.5 | 1.2 |

TABLE 2

| Sex | Esketamine dose (mg/kg) | $t_{max}$ (h) | $C_{max}$ (ng/ml) | $AUC_{0-t}$ (ng * h/ml) | Dose normalized $AUC_{0-t}$ (ng * h/ml)/ (mg/kg) | $t_{1/2}$ (h) |
|---|---|---|---|---|---|---|
| F | 2  | 0.17 | 132.7  | 62   | 31.0 | NC  |
| F | 10 | 0.17 | 767.9  | 514  | 51.3 | 0.4 |
| F | 20 | 0.17 | 1451.1 | 1064 | 53.2 | 0.6 |
| M | 6  | 0.17 | 113.1  | 61   | 10.2 | 0.6 |
| M | 10 | 0.17 | 211.3  | 179  | 17.9 | 0.6 |
| M | 30 | 0.5  | 398.0  | 575  | 19.2 | 1.5 |

Example 4: Long Term Carcinogenic Study

A 104 Week carcinogenicity study of esketamine administered via oral gavage to Sprague Dawley Rats is performed to evaluate the carcinogenic potential and determine the toxicokinetics of esketamine.

As based on the International Conference on Harmonization (ICH) S1 Guidelines S1A, Guideline on the Need for Carcinogenicity Studies of Pharmaceuticals; S1B, Testing for Carcinogenicity of Pharmaceuticals; and S1C(R2), Dose Selection for Carcinogenicity Studies of Pharmaceuticals, 236 male and 236 female Sprague Dawley Rats are administered esketamine over 104 weeks at the doses of 0 (vehicle control), 6, 10 or 30 mg/kg/day for the male rats and 0 (vehicle control), 2, 10 or 20 mg/kg/day for the female rats.

The study end-points include clinical observations, body weight changes, food consumption, bioanalytical toxicokinetic analysis, and anatomic macroscopic and microscopic pathology findings.

It can thus be demonstrated that the genotoxic changes as shown in Examples 1 and 2 were not identified after 28 days administration at point of departure doses and at reduced doses, which factor in an at least 10 fold safety margin after 730 days, thereby providing a minimal safe window for chronic esketamine administration.

Example 5: 7-Day Forced Swim Test in Male Rats

Groups of, 6-7 week old, male Sprague Dawley rats were administered esketamine by intraperitoneal injection and their behavioral despair assessed by a forced swim test. The animals, in cohorts of 10, were administered either a single dose of 15 mg/kg esketamine, 7 daily doses of either 7.5 or 15 mg/kg esketamine or a vehicle control, and the test performed 30 minutes after dosing. Statistical evaluation was performed using an ordinary One-Way ANOVA, t Test and an Uncorrected Fisher's LSD comparisons test.

Continuous 7-day treatment of esketamine produced stronger antidepressant-like effect than a single acute dose at the same doses levels. Esketamine at 7.5 and 15 mg/kg, exerted a statistically significant decrease of 40% and 60% respectively in immobility time following chronic treatment, whereas the extent of the effect was less marked in acute treated rats (42% of control for 15 mg/kg). This indicates that multiple dosing is more effective than a single acute dose of the same dose level and suggests a rationale to treat depressed patients via a chronic, rather than acute, esketamine regimen.

Example 6: A Single Dose, Randomized, Open-Label, Crossover Study in Healthy Volunteers A randomized, open-label 4-way crossover study in 16 healthy male and female subjects was held wherein said subjects were placed in a randomly assigned order and administered esketamine. Each subject was assigned to 1 of 4 treatment sequences according to a randomization code such that 4 subjects were assigned to each treatment sequence. There was a wash-out period of at least 7 days between dosing periods with doses consisting of either oral or intravenous esketamine hydrochloride. The study consisted of an eligibility screening period of 28 days, 4 study periods involving administration of a single dose of esketamine hydrochloride followed by safety assessments with blood sampling for PK purposes up to 72 hours after study drug administration, discharge at 72 hours after study drug administration and a follow-up visit 7-14 days after the last PK blood sample was taken on Day 4.

Fifteen of 16 subjects completed the study. One subject (Subject 11) participated in the first treatment period only. This subject was withdrawn from the study due to an AE of mild hyperbilirubinemia and therefore did not receive the planned treatments in the 3 remaining treatment periods. Subject 11 was not included in the PK set, as presented in Table 3, which therefore included 15 subjects.

TABLE 3

| Parameter | Statistic | 20 mg oral tablet | 20 mg oral solution | 100 mg oral tablet | 0.3 mg/kg iv |
|---|---|---|---|---|---|
| | | Esketamine | | | |
| $C_{max}$ (ng/ml) | Geometric mean (CV %) | 11.92 (45%) | 16.48 (48%) | 65.34 (44%) | 94.50 (33%) |
| $t_{max}$ (h) | Median | 0.75 | 0.50 | 0.75 | 1.00 |
| $AUC_{0-t}$ (ng · h/ml) | Geometric mean (CV %) | 20.05 (58%) | 23.44 (40%) | 172.71 (51%) | 249.15 (21%) |
| $AUC_{0-inf}$ (ng · h/ml) | Geometric mean (CV %) | 22.46 (58%) | 25.82 (39%) | 180.84 (48%) | 257.14 (21%) |
| $t_{1/2}$ (h) | Geometric mean (CV %) | 2.84 (56%) | 2.91 (37%) | 7.66 (33%) | 10.16 (41%) |

TABLE 3-continued

| Parameter | Statistic | 20 mg oral tablet | 20 mg oral solution | 100 mg oral tablet | 0.3 mg/kg iv |
|---|---|---|---|---|---|
| (S)-norketamine | | | | | |
| $C_{max}$ (ng/ml) | Geometric mean (CV %) | 89.73 (22%) | 99.78 (26%) | 351.89 (24%) | 42.25 (16%) |
| $t_{max}$ (h) | Median | 1.00 | 0.75 | 1.00 | 1.25 |
| $AUC_{0-t}$ (ng·h/ml) | Geometric mean (CV %) | 418.33 (22%) | 404.96 (19%) | 2267.52 (19%) | 425.96 (18%) |
| $AUC_{0-inf}$ (ng·h/ml) | Geometric mean (CV %) | 429.05 (22%) | 416.89 (19%) | 2282.91 (19%) | 440.76 (18%) |
| $t_{1/2}$ (h) | Geometric mean (CV %) | 8.75 (28%) | 8.88 (26%) | 9.27 (25%) | 11.26 (28%) |
| (2S,6S)-OH-Norketamine | | | | | |
| $C_{max}$ (ng/ml) | Geometric mean (CV %) | 45.75 (33%) | 46.46 (28%) | 189.32 (24%) | 24.79 (28%) |
| $t_{max}$ (h) | Median | 1.50 | 1.00 | 2.00 | 3.00 |
| $AUC_{0-t}$ (ng·h/ml) | Geometric mean (CV %) | 390.10 (27%) | 365.99 (32%) | 1945.85 (18%) | 376.15 (28%) |
| $AUC_{0-inf}$ (ng·h/ml) | Geometric mean (CV %) | 400.91 (26%) | 377.68 (31%) | 1959.73 (18%) | 389.50 (27%) |
| $t_{1/2}$ (h) | Geometric mean (CV %) | 7.77 (31%) | 7.83 (30%) | 8.92 (26%) | 10.68 (25%) |

Amongst the 15 subjects who completed the study, the treatment was generally well tolerated. A total of 128 TEAEs (treatment-emergent adverse event) were reported by 15 of 16 (94%) subjects of which 79 TEAEs reported by 14 of 16 (88%) subjects were to be related to the study drug. Overall, a total of 14 of 128 TEAEs reported by 4 (25%) subjects were of moderate severity and 114 of 128 TEAEs reported by 15 (94%) subjects were of mild severity. No severe TEAEs or SAEs were reported. The most frequently occurring adverse events (reported more than twice) were headache, dizziness, hypokinesia, feeling abnormal, fatigue, euphoric mood inappropriate affect, nausea and hyperhidrosis. Table 4 presents the frequency of the most frequently reported related TEAEs as a percentage of the subjects that experienced an adverse effect per treatment.

TABLE 4

| TEAE | 20 mg oral tablet/% | 20 mg oral solution/% | 100 mg oral tablet/% | 0.3 mg/kg iv/% |
|---|---|---|---|---|
| Headache | — | 19 | 13 | 19 |
| Dizziness | 13 | — | 13 | 6 |
| Hypokinesia | — | — | 13 | 6 |
| Feeling abnormal | 7 | 19 | 20 | 13 |
| Fatigue | 7 | — | — | 6 |
| Euphoric mood | — | — | 13 | 19 |
| Inappropriate affect | — | 6 | 7 | 6 |
| Nausea | — | — | 20 | 6 |
| Hyperhidrosis | 7 | — | 7 | — |

Example 7: Oral Esketamine Dosage Forms

Oral dosage forms of esketamine hydrochloride were manufactured according to the procedures described in WO2016094358, which is incorporated in its entirety, herein, by reference.

A population PK modeling analyses was performed on the results of Example 5 to provide simulated PK data following a multiple dose regimen of the doses described herein.

The formulations and their predicted steady state PK parameters are presented in Table 5.

TABLE 5

| | 5 mg tablet* | 10 mg tablet | 20 mg tablet | 40 mg tablet |
|---|---|---|---|---|
| Ingredient (% (w/w)) | | | | |
| 16.0% Coated Esketamine Granules | 312.5 | 6.25 | 12.50 | 25.00 |
| Coated Polymer Granules | 30.55 | 27.42 | 21.17 | 7.06 |
| Mannitol | 28.13 | 28.13 | 28.13 | 29.74 |
| Crospovidone | 20.00 | 20.00 | 20.00 | 20.00 |
| Microcrystalline Cellulose | 13.00 | 13.00 | 13.00 | 13.00 |
| Carbomer | 2.00 | 2.00 | 2.00 | 2.00 |
| Sodium Bicarbonate | 2.00 | 2.00 | 2.00 | 2.00 |
| Colloidal silicon Dioxide | 0.20 | 0.20 | 0.20 | 0.20 |
| Magnesium stearate | 1.00 | 1.00 | 1.00 | 1.00 |
| Predicted steady state pharmacokinetic parameters | | | | |
| Esketamine $C_{max}$ (ng/ml) | 2.04 | 4.09 | 9.03 | 18.33 |
| Esketamine $AUC_{0-tau}$ (ng·h/ml) | 6.4 | 12.7 | 29.0 | 61.8 |
| (S)-norketamine $C_{max}$ (ng/ml) | 16.46 | 32.92 | 68.63 | 136.02 |
| (S)-norketamine $AUC_{0-tau}$ (ng·h/ml) | 97.3 | 194.6 | 413.4 | 835.2 |

*data calculated based on 10 mg predicted data

Example 7: A Dose Range Finding, Multicenter, Double-Randomized, Double-Blind, Placebo-Controlled Study, to Determine the Safety and Efficacy 10 mg, 20 mg and 40 mg Oral Esketamine in Depressive Episodes in Bipolar 1 Disorder Patients A dose range finding, double-randomized, double-blind, placebo-controlled study compares the efficacy, safety and tolerability of once daily 10, 20 or 40 mg oral esketamine to placebo treatment in 204 bipolar I subjects with major depressive episodes. All subjects remain on their current anti-depressant with no dose change during the study.

The study comprises 3 phases, screening (Days 0-28), double-blind treatment (days 29-56) composed of two 2-week periods (period 1, period 2) and post-treatment safety follow-up (days 57-70) following the last study treatment administration.

During screening, subjects are assessed for study eligibility and washed out from disallowed drugs. After being found eligible, subjects are randomized at the beginning of Period 1 using a 3:1:1:1 allocation scheme to receive, once daily, either placebo or 10 mg, 20 mg or 40 mg oral esketamine, respectively. At the conclusion of period 1, all subjects are blindly assessed for response based on their change in MADRS-10 score from baseline to week 2. Subjects who received placebo during period 1 are re-randomized using a 1:1:1:1 allocation scheme to receive in the 2 weeks (period 2) either placebo or 10 mg, 20 mg or 40 mg oral esketamine once daily, respectively. The re-randomization is stratified by the placebo response in Period 1 (Change in MADRS < or ≥50% and MADRS score < or ≥18). Subjects that were on oral esketamine in period 1 remain on the drug at the same dosage for the 2 weeks of period 2.

Subjects receive the first dose of their study drug at the study site and are then closely monitored for 3 hours to assess for potential neuropsychiatric adverse events using a comprehensive set of scales to identify sleepiness, sedation and dissociative effects. Thereafter, the subject is provided with a 1 week supply of the study drug for administration at their place of residence and instructed to take the study drug in the evening (except at the day of the weekly visit when it is taken at the study site) and not to drive until the next morning. At every subject visit, a psychiatrist evaluates the subject's MADRS-10 score.

The study's primary efficacy endpoint is the change from baseline to week 2 (in the 2 periods) in 10 items Montgomery-Åsberg Depression Rating Scale (MADRS-10).

Secondary efficacy endpoints include the change from baseline Sheehan disability scale (SDS) at 2 weeks, remission rate at 2 weeks (MADRS-10≤10), responder rate at 2 weeks (≥50% improvement in MADRS-10), change from baseline in self-rated Symptoms of Depression Questionnaire (SDQ) at 2 weeks, physician administered Clinical Global Impression Improvement (CGI-I) at 2 weeks and the change from baseline in Physician administered Clinical Global Impression Severity (CGI-S) at 2 weeks.

Exploratory Endpoints include the change from baseline to week 4 in Montgomery-Åsberg Depression Rating Scale (MADRS-10) for the subset of subjects receiving the same study drug for the 4 weeks.

Safety and tolerability endpoints include adverse events, hematology, biochemistry and urinalysis, immunological parameters, physical examination findings, blood pressure and heart rate every 30 minutes for the 3 hours following study drug administration, 12 lead ECG findings, withdrawal rates, Digit Symbol Substitution Test (DSST), reaction time test (Cambridge COGNITION), self-administered Stanford sleepiness scale, a Bladder Pain/Interstitial Cystitis Symptom Score (BPIC-SS), a Modified Observer's Alertness/Sedation Scale (MOAA/S), a Clinician-Administered Dissociative States Scale (CADSS), a suicidality scale-Clinician-Rated Columbia Suicide Severity Rating Scale (C-SSRS), 4 items positive symptoms subscale from the Brief Psychiatric Rating Scale (BPRS) and 20 item Physician Withdrawal Checklist (PWC-20) during the follow-up period.

Those skilled in the art will appreciate that numerous changes and modifications can be made to the preferred embodiments of the disclosure and that such changes and modifications can be made without departing from the spirit of the disclosure. It is, therefore, intended that the appended claims cover all such equivalent variations as fall within the true spirit and scope of the disclosure.

What is claimed:

1. A method of treating a condition other than major depressive disorder (MDD) in a human patient in need thereof comprising orally administering once-daily to said patient an immediate release oral dosage form comprising esketamine over a treatment regimen of at least 28 days, and wherein
   a. the esketamine $C_{max}$ of said administration is 30 ng/ml or less, or
   b. the esketamine $AUC_{0-t}$ of said administration is 60 ng*h/ml or less, or
   c. the esketamine $C_{max}$ of said administration is 30 ng/ml or less and the $AUC_{0-t}$ of said administration is 60 ng*h/ml or less.

2. The method of claim 1, wherein the condition is selected from the group consisting of acute stress disorder, alcohol dependence disorder, alcohol use disorder, anorexia nervosa, anxiety disorders, bipolar disorder, borderline personality disorder, bulimia nervosa, PMDD, schizoaffective disorder, ALS, Alzheimer's disease, chronic fatigue, diabetic neuropathy, dyskinesia, fibromyalgia, opioid tolerance, pain and traumatic brain injury and schizophrenia.

3. The method of claim 2, wherein the anxiety disorder is selected from the group consisting of Generalized Anxiety Disorder, Social Anxiety Disorder, agoraphobia, Panic Disorder and phobias.

4. The method of claim 1, wherein the oral dosage form comprises about 40 mg of esketamine.

5. The method of claim 1, wherein the treatment regimen is between 28 days and about 730 days.

6. The method of claim 5, wherein the treatment regimen is between 28 days and about 365 days.

7. The method of claim 1, wherein the treatment regimen results in a reduction of the symptoms of the condition other than major depressive disorder after at least 28 days of treatment.

8. The method of claim 1, further comprising the administration of a second medication other than (R)-ketamine.

9. The method of claim 8, wherein the second medication is an antidepressant an anticonvulsant, an antipsychotic, a mood stabilizer, an anxiolytic or an antimanic agent.

10. The method of claim 1, wherein the esketamine $C_{max}$ of said administration is 30 ng/ml or less and the esketamine $AUC_{0-t}$ of said administration is 60 ng*h/ml or less.

11. The method of claim 10, wherein the esketamine $C_{max}$ of said administration is 15 ng/ml or less and/or the esketamine $AUC_{0-t}$ of said administration is 30 ng*h/ml or less.

12. The method of claim 1, wherein the esketamine is esketamine hydrochloride.

13. A method of treating a condition other than major depressive disorder in a human patient in need thereof comprising once-daily orally administering to said patient an immediate release oral dosage form comprising esketamine, and wherein said dosage form provides for an (S)-norketamine $C_{max}$ of between 15 and 150 ng/ml and/or an (S)-norketamine $AUC_{0-t}$ of between 105 and 850 ng*h/ml.

14. The method of claim 13, comprising orally administering to said patient a dosage form, wherein said dosage form provides for an(S)-norketamine $C_{max}$ of between 15 and 150 ng/ml and an (S)-norketamine $AUC_{0-t}$ of between 105 and 850 ng*h/ml.

15. A method of treating a condition other than major depressive disorder in a human patient in need thereof comprising once-daily orally administering to said patient an immediate release oral dosage form comprising esketamine, and wherein said dosage form provides for an (2S,6S)—

OH-norketamine $C_{max}$ of between 15 and 75 ng/ml and/or an (2S,6S)—OH-norketamine $AUC_{0-t}$ of between 105 and 850 ng*h/ml.

16. The method of claim 15, comprising orally administering to said patient a dosage form, wherein said dosage form provides for an (2S,6S)—OH-norketamine $C_{max}$ of between 15 and 75 ng/ml and an (2S,6S)—OH-norketamine $AUC_{0-t}$ of between 105 and 850 ng*h/ml.

* * * * *